United States Patent [19]
Shirai et al.

[11] Patent Number: 5,751,211
[45] Date of Patent: May 12, 1998

[54] OBSTACLE WARNING SYSTEM FOR A VEHICLE

[75] Inventors: Noriaki Shirai, Oobu; Katsuhiko Hibino, Kariya; Takao Nishimura, Nagoya, all of Japan

[73] Assignee: Denso Corporation, Kariya, Japan

[21] Appl. No.: 777,196

[22] Filed: Dec. 27, 1996

[30] Foreign Application Priority Data

Dec. 28, 1995 [JP] Japan ................... 7-343624

[51] Int. Cl.⁶ .................................. B60Q 1/00
[52] U.S. Cl. .................. 340/435; 340/436; 340/903; 340/904; 342/70; 342/71; 367/909; 364/460; 364/426.04; 180/169
[58] Field of Search ................... 340/435, 436, 340/901, 903, 904; 342/70, 71; 367/909, 112, 96, 97, 107; 364/460, 461, 426.04; 180/167, 168, 169

[56] References Cited

U.S. PATENT DOCUMENTS

| | | | |
|---|---|---|---|
| 4,011,563 | 3/1977 | Robbi | 342/71 |
| 4,016,566 | 4/1977 | Fujiki | 342/71 |
| 4,097,864 | 6/1978 | Endo et al. | 342/71 |
| 4,165,511 | 8/1979 | Wocher et al. | 342/71 |
| 5,291,207 | 3/1994 | Kikuchi et al. | |
| 5,343,206 | 8/1994 | Ansaldi et al. | 342/70 |
| 5,461,357 | 10/1995 | Yoshioka et al. | 340/435 |
| 5,479,173 | 12/1995 | Yoshioka et al. | 342/70 |
| 5,574,463 | 11/1996 | Shirai et al. | 342/70 |

FOREIGN PATENT DOCUMENTS

| | | |
|---|---|---|
| 5-159199 | 6/1993 | Japan . |
| 5-180933 | 7/1993 | Japan . |
| 5-288847 | 11/1993 | Japan . |
| 7-134179 | 5/1995 | Japan . |
| 7-262498 | 10/1995 | Japan . |
| 7-262499 | 10/1995 | Japan . |
| 7-291063 | 11/1995 | Japan . |
| 7-294634 | 11/1995 | Japan . |
| 7-296298 | 11/1995 | Japan . |
| 7-318652 | 12/1995 | Japan . |
| 8-279099 | 10/1996 | Japan . |

*Primary Examiner*—Thomas Mullen
*Assistant Examiner*—Nina Tong
*Attorney, Agent, or Firm*—Cushman Darby & Cushman IP Group of Pillsbury Madison & Sutro LLP

[57] ABSTRACT

As provided here, an obstacle warning system for a vehicle is capable of issuing an alarm accurately according to the curved state of a road. When the road is curved, the system sets the correction time counter on the basis of the following conditions: whether or not the curvature radius of the curved road is small; whether or not a guardrail is detected immediately ahead of the vehicle; whether or not an erroneously-recognized object, such as a set of guardrail reflectors exhibiting large relative acceleration is immediately ahead of the vehicle; and whether or not the number of obstacles recognized reaches a value indicating that the vehicle is approaching a curved section of the road. When a stationary object enters the field of view indicating that there is a possibility of a collision, the obstacle warning system corrects the warning distance in response to the value of the correction time counter, thus making it possible to avoid a false alarm during cornering.

8 Claims, 17 Drawing Sheets

OBSTACLE WARNING SYSTEM FOR A VEHICLE

BACKGROUND OF THE INVENTION

1. Field of the Invention

This invention relates to an obstacle warning system for a vehicle where the system detects an obstacle or obstacles within a forward detection zone defined by a given angle in a width direction of a system vehicle equipped with the system and issues an alarm according to the result of the detection.

2. Description of the Related Art

An obstacle warning system for a vehicle is designed, which includes: obstacle detecting means for detecting a distance to and an angle of an obstacle within a range of a given angle in a width direction of a system vehicle equipped with the system, and warning mean for issuing an alarm when the obstacle detected by the obstacle detecting means satisfies a given warning condition. This type of system issues an alarm when the system vehicle moves into proximity to an obstacle such as a preceding vehicle so that a clash accident can be avoided.

However, the system of this type may issue a false alarm to a road-side object during cornering. To avoid such a situation, several kinds of improvements have been studied. For example, Japanese published patent application No. 5-159199 discloses a system, which when the distance to an obstacle strictly increases or decreases according to changes in angle, obstacle regards the obstacle such as a guardrail or reflectors on a road shoulder so that no alarm will be generated.

Even such a system may issue a false alarm in the following case. For example, as shown in FIG. 18, when a large object such as a billboard 105 is present at a side edge of a curved road 101 together with reflectors 103, the distance to the billboard 105 does not strictly increase according to changes in angle. In this case, the system processes data representing the billboard 105 as if a stationary vehicle were on the road 101.

Although such a situation can be avoided by properly setting a distance (warning distance) between a subject vehicle 107 and an obstacle as a warning condition, the setting is difficult because the distance between the subject vehicle 107 and the billboard 105 varies according to changes in curvature (curved state). If the warning distance is set too short, the system may be late issuing an alarm in the case where an actual obstacle is on the road 101. Since no prior-art warning system takes curved states of a road into account when issuing an alarm, occurrence of false alarms cannot be controlled sufficiently.

SUMMARY OF THE INVENTION

It is therefore an object of the present invention to provide for a vehicle an obstacle warning system that is able to issue an alarm accurately according to the curved state of a road even when the vehicle travels a curved road.

In order to achieve the above object, a first aspect of the present invention provides an obstacle warning system for a vehicle, as shown in FIG. 19, which includes obstacle detecting means for detecting a distance to and an angle of an obstacle within a range of a given angle in a width direction of the vehicle, and warning means for issuing an alarm when the detected obstacle satisfies a given warning condition; charge. The obstacle warning system comprises: guardrail detecting means, which when the obstacle detected by the obstacle detecting means extends a long distance along a forward direction of the vehicle, recognizes the obstacle as a guardrail on the basis of the distance to and angle of the obstacle detected by the obstacle detecting means; curved state detecting means for detecting the curved state of a road on the basis of position of the guardrail detected by the guardrail detecting means; and warning condition correcting means for correcting the warning condition on the basis of the curved state of the road detected by the curved state detecting means.

According to the first aspect of the present invention, when the obstacle -detected by the obstacle detecting means extends a long distance along the forward direction of the vehicle, the guardrail detecting means recognizes the obstacle as a guardrail on the basis of the distance to and angle of the obstacle detected by the obstacle detecting means because most of the time an object extending a long distance along the forward direction of the vehicle is a guardrail. Further, the curved state detecting means detects the curved state of the road on the basis of the position of the guardrail detected by the guardrail detecting means. For example, the guardrail's presence immediately ahead of the vehicle indicates that the vehicle has entered a sharp curve section of the road, whereas the guardrail's present in the width direction at a distance away from the vehicle indicates that the current road is a straight road.

Thus, the curved state detecting means accurately detects the curved state of the road. Consequently, the warning condition correcting means corrects the warning condition on the basis of the curved state of the road detected by the curved state detecting means, so that the warning means issues an alarm on the basis of the corrected warning condition, thereby issuing an alarm accurately according to the curved state of the road even when the vehicle has entered a curved road. Since the guardrail detecting means and the curved state detecting means detect the curved state on the basis of the distance to and angle of the obstacle, means for detecting a steering angle or the like do not need to be provided in this system, thereby simplifying the system structure.

A second aspect of the present invention is based on the first aspect of the present invention, and provides an obstacle warning system further comprising curvature radius calculating means for calculating a curvature radius from the path or locus of the stationary object detected by the obstacle detecting means, wherein the curved state detecting means detects the curved state on the basis of both the position of the guardrail and the curvature radius calculated by the curvature radius calculating means.

According to the second aspect of the present invention, the warning condition correcting means is able to issue an alarm on the basis of the warning condition corrected by the curvature radius. Therefore, the obstacle warning system according to the second aspect of the present invention can issue an alarm more accurately than the system according to the first aspect of the present invention. Further, this obstacle warning system is able to calculate the curvature radius from the path or locus of a stationary object such as a reflector, so that an alarm can be generated according to the curved state even when only a reflector or reflectors are arranged on the road shoulder without a guardrail.

A third aspect of the present invention is based on the first or second aspect of the present invention, and provides an obstacle warning system wherein the curved state detecting means detects the curved state on the basis of both the position of the guardrail and whether or not the number of obstacles detected by the obstacle detecting means exceeds a given value.

In general, there is a certain upper limit on the number of obstacles such as a preceding vehicle, so that, when the detected obstacles exceeds the given value, the detected obstacles may contain lots of road-side objects (e.g., reflectors on the road shoulder). It is therefore considered in this case that the road is curved. This is why the obstacle warning system according to the third aspect of the present invention detects the curved state on the basis of both the position of the guardrail and whether or not the number of detected obstacles exceeds the given value.

The obstacle warning system according to the third aspect of the present invention enables more accurate detection of the curved state, and hence more accurate generation of an alarm than the system according to the first or second aspect of the present invention. Further, this obstacle warning system can issue an alarm according to the curved state, as is similar to the system according to the second aspect of the present invention, even when only a reflector or reflectors are arranged on the road shoulder without a guardrail.

A fourth aspect of the present invention is based on any one of first to third aspects of the present invention, and provides an obstacle warning system further comprising acceleration calculating means for calculating relative acceleration between the subject vehicle and the obstacle detected by the obstacle detecting means, and erroneously-recognized object detecting means for identifying the obstacle as an erroneously-recognized object when the relative acceleration of the obstacle provided by the acceleration calculating means is out of a given range, wherein the curved state detecting means detects the curved state on the basis of both the position of the guardrail and whether or not the erroneously-recognized object is detected in a given detection zone defined ahead of the subject vehicle.

In the case where a plurality of objects such as reflectors are detected sequentially by the obstacle detecting means, the reflectors being arranged on the road shoulder at equal distances, each of the reflectors may be recognized erroneously as if it were an obstacle. In this case, the obstacle (erroneously-recognized object), which is erroneously recognized as an obstacle, moves very randomly, such that the relative acceleration thereof cannot exist within a range in which relative acceleration of an object such as a preceding vehicle can exist. Accordingly, the erroneously-recognized object detecting means detects and identifies such an obstacle as an erroneously-recognized object because the obstacle has the relative acceleration which is out of the above range.

In the case where the erroneously-recognized object is detected in the given forward detection zone of the subject vehicle, it is considered that the road is sharply curved. This is why the obstacle warning system according to the fourth aspect of the present invention detects the curved state on the basis of both the position of the guardrail and whether or not an erroneously-recognized object is detected in the given forward detection zone of the subject vehicle. The obstacle warning system according to the fourth aspect of the present invention enables still more accurate detection of the curved state, and hence still more accurate generation of the alarm than the system according to any one of the first to third aspects of the present invention. Further, this obstacle warning system can issue an alarm in response to the curved state, as is similar to the system according to the second and third aspects of the present invention, even when only a reflector or reflectors are arranged on the road shoulder without a guardrail.

BRIEF DESCRIPTION OF THE DRAWINGS

These objects and features of the present invention will become more readily apparent from the following detailed description of the preferred embodiments taken in conjunction with the accompanying drawings in which.

DETAILED DESCRIPTION OF THE INVENTION

Figure 1:
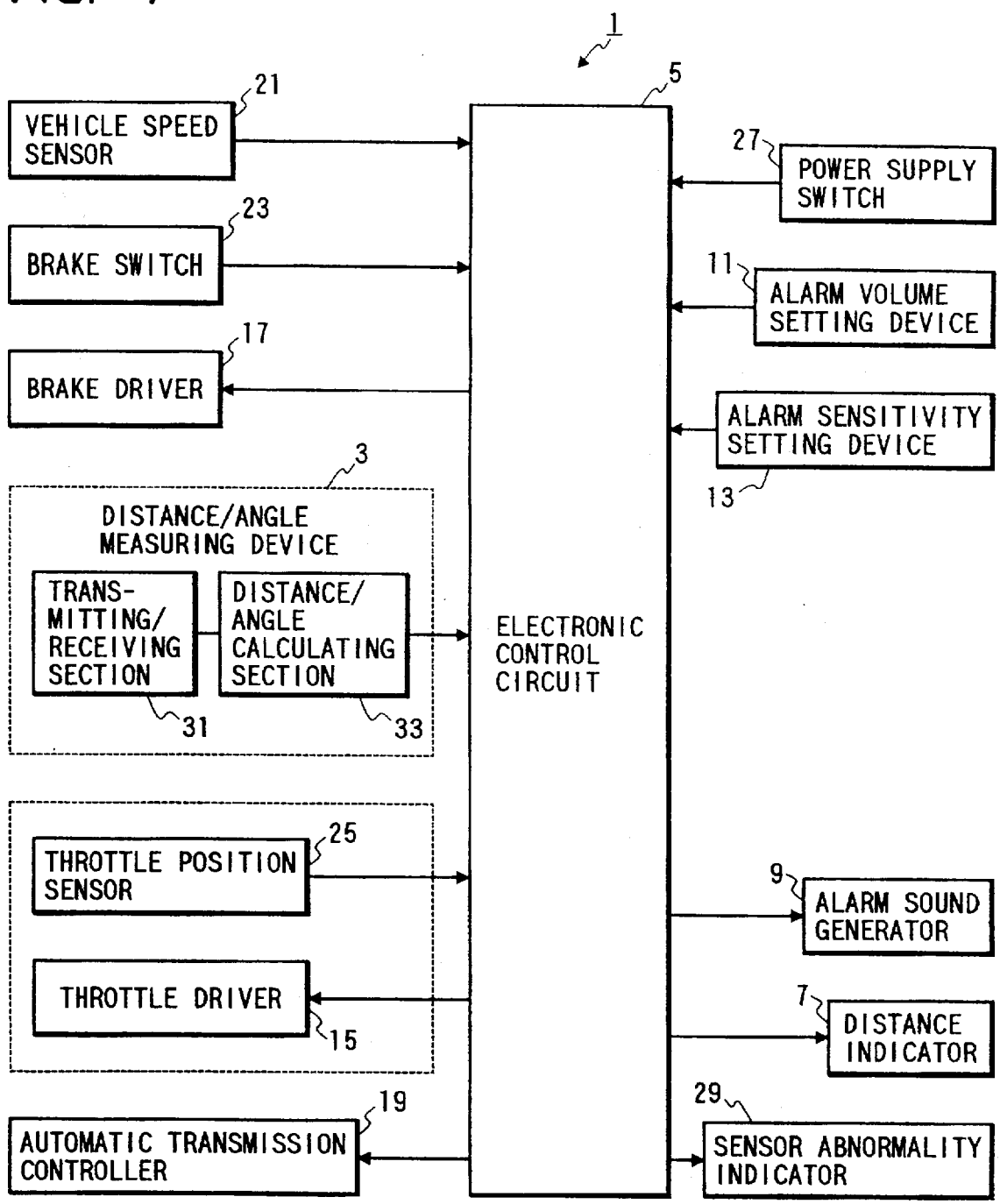
FIG. 1 is a block diagram showing a structure of a vehicle control system to which the present invention is applied.

An embodiment of the present invention will now be described with reference to the drawings. FIG. 1 is a block diagram showing a structure of a vehicle control system 1 to which the present invention is applied. The vehicle control system 1 includes a distance/angle measuring device 3 serving as obstacle detecting means. The vehicle control system 1 executes either or both of control processes in response to a setting position of a mode switch, not shown, one is a collision avoiding process in which the vehicle control system 1 detects a preceding vehicle ahead of a subject vehicle using the distance/angle measuring device 3 and generates an alarm sound when the preceding vehicle enters a given warning area in a forward direction of the subject vehicle, and the other is traveling control process in which the vehicle control system 1 controls the speed of the subject vehicle to hold the distance between the preceding vehicle and the subject vehicle at a predetermined value.

As shown in FIG. 1, a detection signal output from the distance/angle measuring device 3 is supplied to an electronic control circuit 5. As will be described later, the electronic control circuit 5 recognizes a preceding vehicle ahead of the subject vehicle in response to the detection signal output from the distance/angle measuring device 3. Further, the electronic control circuit 5 outputs a drive signal to a distance indicator 7 so that a inter-vehicle distance between the subject vehicle and the preceding vehicle will be indicated. In the case where the collision avoiding process is selected, when the preceding vehicle enters the warning distance as described later, the electronic control circuit 5 outputs a drive signal to an alarm sound generator 9 serving as warning means so that an alarm sound will be generated by the alarm sound generator 9. An alarm volume setting device 11 and an alarm sensitivity setting device 13 are connected to the electronic control circuit 5 so that the alarm volume and the alarm sensitivity will be adjusted by the electronic control circuit 5.

During execution of the traveling control process, the electronic control circuit 5 serves to adjust the speed of the subject vehicle. To this end, the electronic control circuit 5 outputs drive signals to a throttle driver 15 for actuating a throttle valve, a brake driver 17 for actuate a brake and an automatic transmission controller 19 for adjusting an automatic transmission, respectively. The electronic control circuit 5 is also connected to a vehicle speed sensor 21 for outputting a signal representing a speed of the subject vehicle, a brake switch 23 for outputting a signal representing an operational condition of the brake and a throttle position sensor 25 for outputting a signal representing the degree of opening of the throttle valve. The electronic control circuit 5 thus receives data, which are needed to execute the collision avoiding process and the traveling control process, from the vehicle speed sensor 21, the brake switch 23 and the throttle position sensor 25. Further, the electronic circuit 5 is connected to a power supply switch 27 and a sensor abnormality indicator 29. The power supply switch 23 serves to feed electric power from a power supply circuit, not shown, to the electronic control circuit 5 in response to operation of a key switch. The sensor abnormality indicator 29 serves to indicate occurrence of a sensor abnormality among the sensors 21 to 25 in response to a drive signal output from the electronic control circuit 5.

The distance/angle measuring device 3 includes a transmitting/receiving section 31 and a distance/angle calculating section 33. The transmitting/receiving section 31 emits pulses of a laser light beam at each given angle, for example, 0.5 degree, to scan a given angular range in a forward direction of the subject vehicle, and detects a reflected light beam from an object ahead of the subject vehicle. The distance/angle calculation section 33 calculates a distance to and an angle (direction) of the preceding object ahead of the subject vehicle on the basis of time after the transmitting/receiving section 31 emitted the laser light beam until capturing the reflected light beam. Such a distance/angle measuring device is well known to those skilled persons in the art and the detailed description thereof will be omitted. The distance/angle measuring device 3 may use an electric wave, such as a microwave or an ultrasonic wave, instead of laser light. Further, the distance/angle measuring device 3 may adopt a mono-pulsed system instead of the scan type system, in which the transmitting/receiving section 31 has two or more receivers and the distance/angle calculating section 33 calculates a distance to and an angle of an obstacle ahead of the subject vehicle on the basis of differences in strength and phase (time) between received signals.

Figure 2:
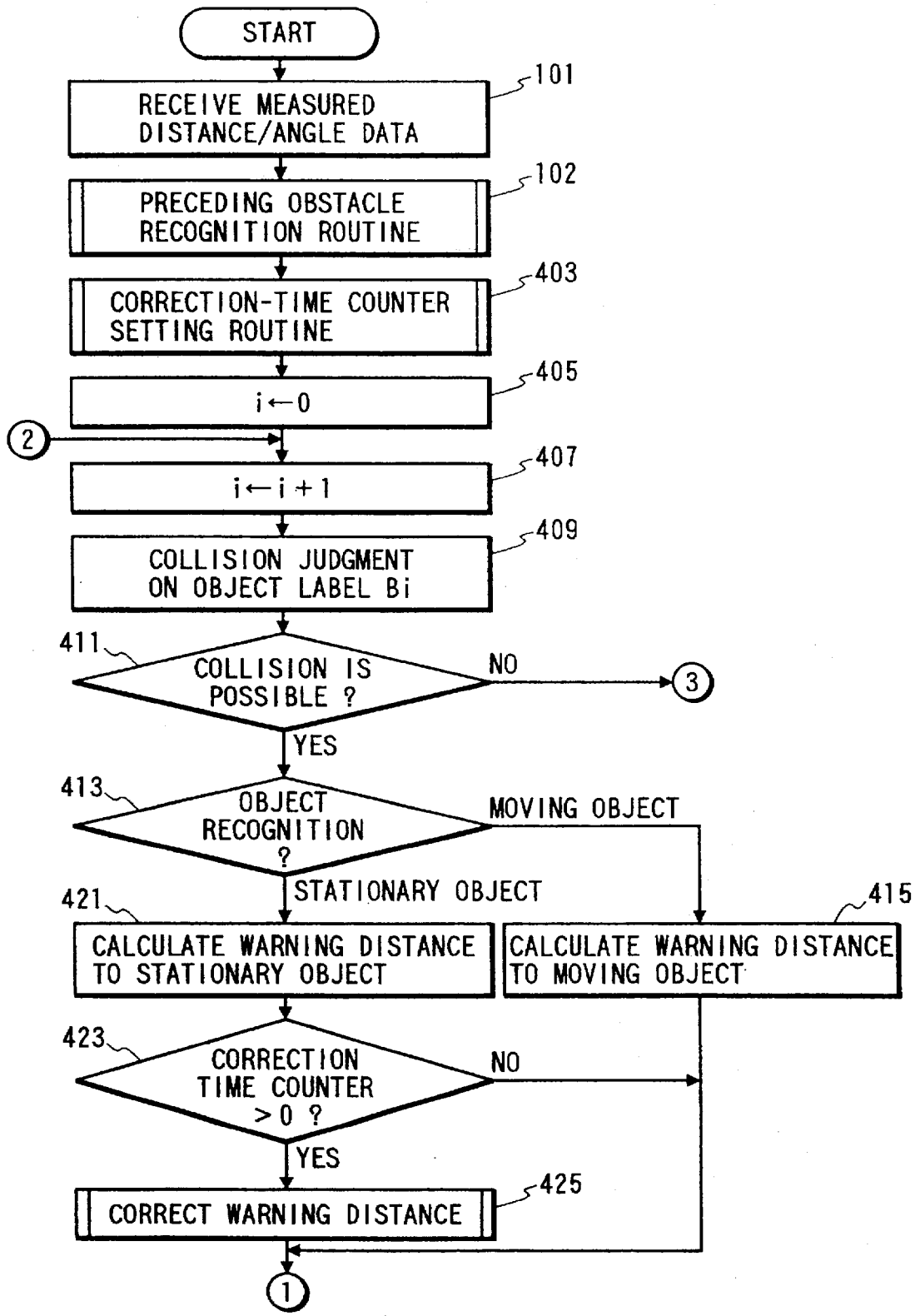
FIG. 2 is a flowchart showing a portion of an obstacle warning operation of the vehicle control system.
Figure 3:
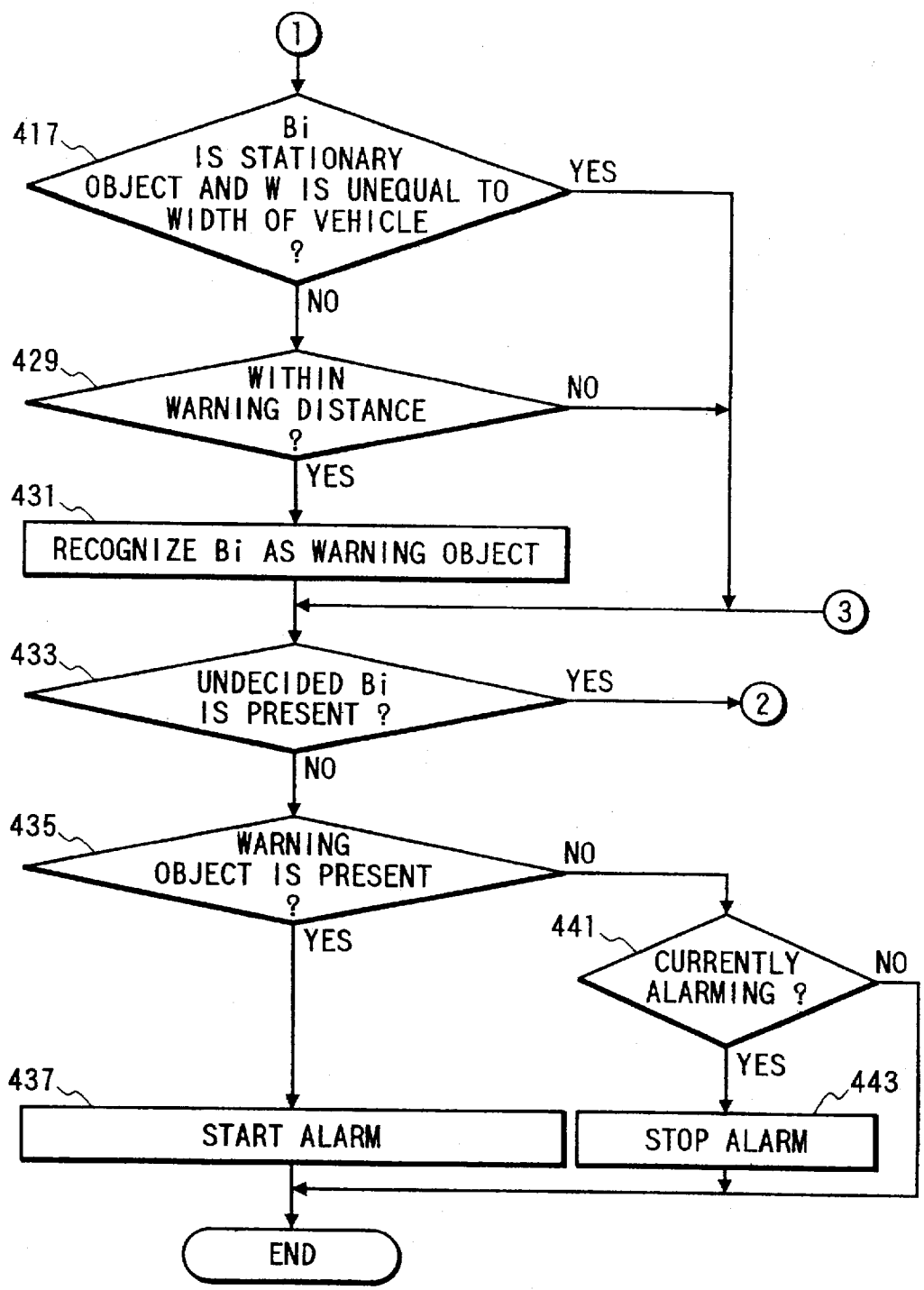
FIG. 3 is a flowchart showing a remaining portion of the obstacle warning operation of the vehicle control system.

After calculating the distance to and the angle of the obstacle, the distance/angle calculating section 33 inputs the results of calculation (hereinbelow, referred to as one-dimensional distance data) to the electronic control circuit 5. During execution of the collision avoiding process, the electronic control circuit 5 issues an alarm in response to the input of the one-dimensional distance data in the following manner. FIGS. 2 and 3 show a flowchart of the main routines of an obstacle warning program executed by the electronic control circuit 5. The electronic control circuit 5 repeats the program every 128 ms.

Figure 5A:
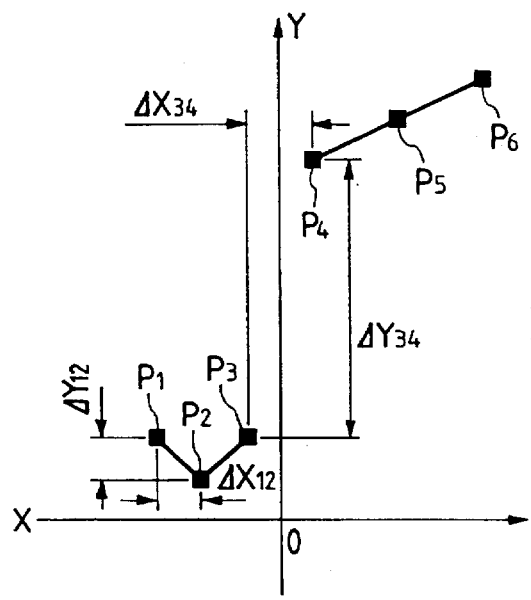
FIGS. 5A and 5B are diagrams explaining creation of line segments in the preceding obstacle recognition routine.

As shown in FIG. 2, the program has a first step 101. The step 101 receives the one-dimensional distance data from the distance/angle calculating section 33, and transforms the received data in a given manner for recognizing or determining the position of the obstacle in orthogonal coordinates. Since the distance/angle measuring device 3 emits pulses of the laser light beam at each given angle, for example, 0.5 degree, to scan a given angular range, an obstacle or obstacles are recognized as discrete points, as exemplified by points P1 to P6 in FIG. 5A. A step 102 following the step 101 executes a preceding obstacle recognition routine for recognizing an obstacle ahead of the subject vehicle as an object label.

Figure 4:
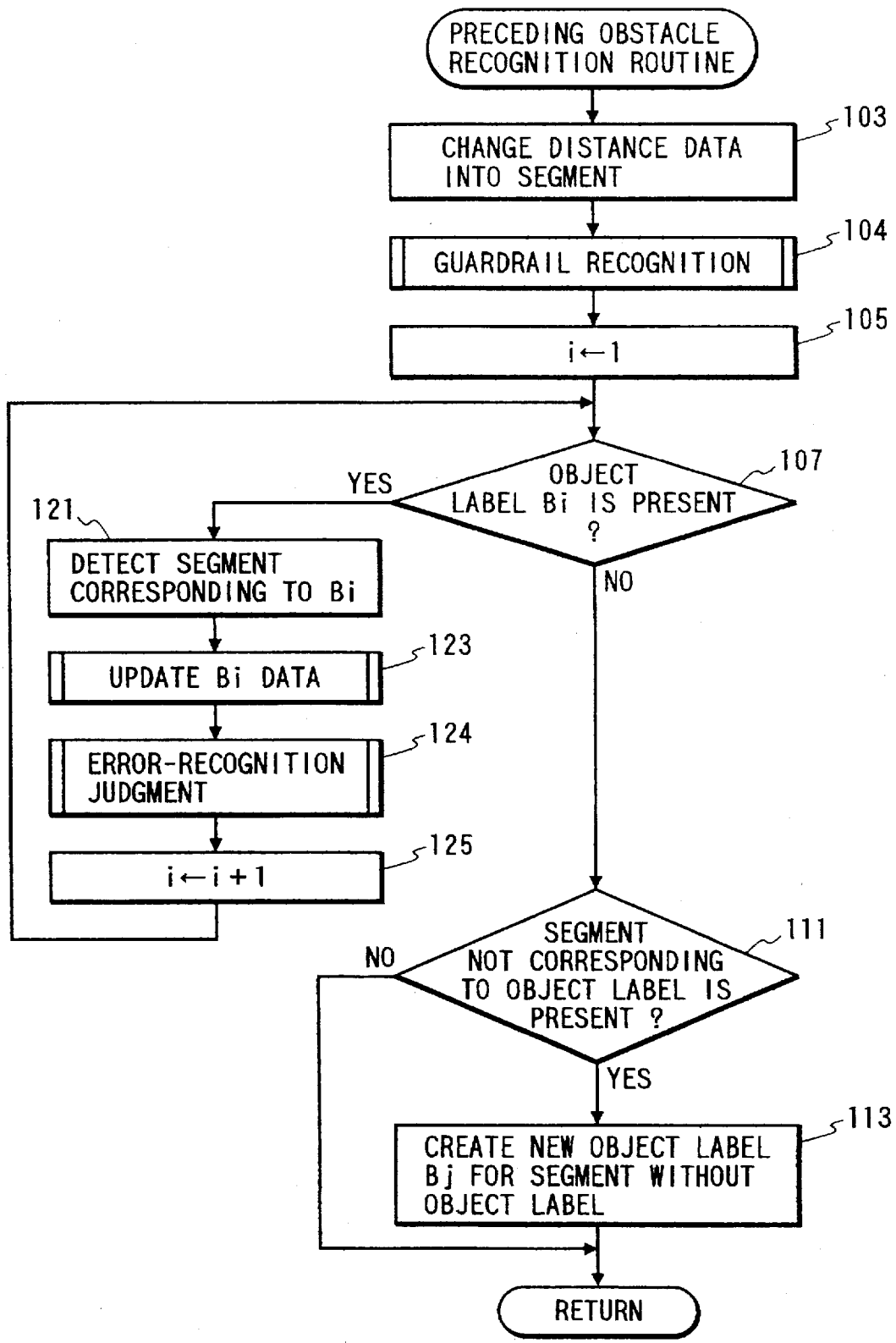
FIG. 4 is a flowchart showing a preceding obstacle recognition routine in FIG. 2.

FIG. 4 is a flowchart showing details of the preceding obstacle recognition routine corresponding to the step 102. In this routine, a first step 103 unites adjacent points among the points provided by the step 101 and recognizes each adjacent-point set as a line segment having a length only along the width direction of the subject vehicle.

Figure 5B:
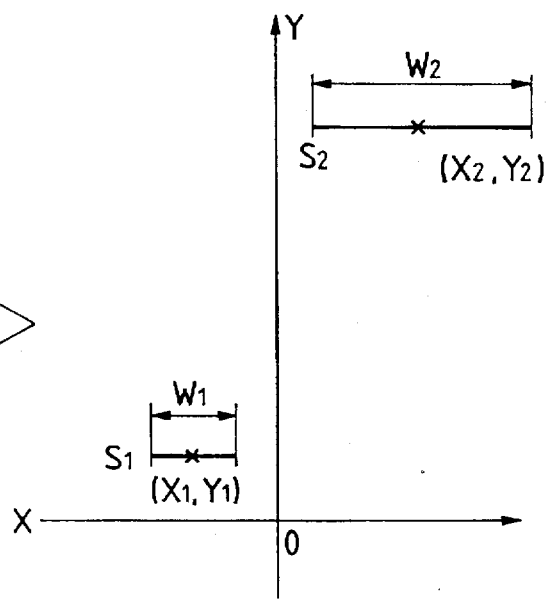

The "adjacent" points to form a line segment are generally defined on the basis of given conditions. In the vehicle control system 1, points spaced with each other by a given angular interval along an X-axis direction (the width direction of the subject vehicle) equal to or less than the emission interval of the laser light beam and by a given distance along a Y-axis direction (the longitudinal direction of the subject vehicle) less than 0.3 m are defined as adjacent points. In the example shown by FIG. 5A, the points P1 and P2 are spaced from each other by an angular interval $\Delta$ X12 along the X-axis direction equal to or less than the emission interval of the laser light beam and by a distance $\Delta$ Y12 along the Y-axis direction less than 3.0 m. Therefore, the step 103 units points P1 and P2 into an adjacent-point set. On the other hand, the points P3 and P4 are spaced from each other by a distance $\Delta$ Y34 along the Y-axis direction more than 3.0 m, so that the step 103 does not unite points P3 and P4 into an adjacent-point set. In the example shown by FIG. 5B, the step 103 thus recognizes sets of unitable points (points P1 to P3 and points 4 to 6) as line segments S1 and S2 having widths W1 and W2 (i.e., lengths along the width direction of the subject vehicle), respectively. In other words, the width denotes a distance between the left-hand end point and the right-hand end point of each line segment. In this case, each point has a width defined by the emission interval of the laser light beam. The Y position of each of the line segments S1 and S2 is set to a mean of the Y positions of the points P1, P2 and P3 or the points P4, P5 and P6. The electronic control circuit 5 defines each of the line segments S1 and S2 by parameters including its center position (X1, Y1) or (X2, Y2) and its width W1 or W2. Such defined line segments are used for calculations as described later.

In the case where a unitable point set is present over a length of 6 m or more along the Y-axis direction, the step 103 does not recognize it as a line segment. A step 104 following the step 103 recognizes such a point set as a guardrail, and memorizes, as guardrail data, the coordinates of the left-hand point, the coordinates of the right-hand point and the coordinates of the mid-point between the left-hand end and the right-hand end (hereinbelow, referred to as the center coordinates or center position of the guardrail data).

A step 105 following the step 104 sets a variable "i" to 1. After the step 105, the program advances to a step 107. The step 107 determines whether an object label Bi is present or absent, where "i" denotes a natural number. As will be made clear later, the object label Bi corresponds to a model of an obstacle which is created for a set of line segments. Since the object label Bi is not created for the first time, the step 107 determines that the object label Bi is absent. After the step 107, the program advances to a step 111. The step 111 determines whether or not there is at least one line segment to which an object label Bi has not yet been given. As previously described, no object label Bi is created for the first time. During the first execution cycle of the program, when the step 103 recognizes a line segment or line segments, corresponding object labels Bi have not yet been given to such line segments at the moment of the execution of the step 111. In this case, the program advances from the step 111 to the step 113.

The step 113 creates new object labels Bj (j=1, 2, . . .) for respective line segments in the order of from the nearest line segment with respect to the subject vehicle. After creating all the object labels in the step 113, the current execution cycle of this routine ends and the program returns to the main routine.

Every object label Bj has the following data pieces: a data piece representing the current coordinates (X, Y) of the center of the related line segment, a data piece representing the width W of the related line segment, a data piece representing the speed VX of the related line segment relative to the subject vehicle along the X-axis direction, a data piece representing the speed VY of the related line segment relative to the subject vehicle along the Y-axis direction, data pieces representing the 16 previous coordinates (X, Y) of the center of the related line segment, and a data piece representing a condition flag Fj. During the creation of every object label Bj by the step 113, these data pieces are set as follows. The current center coordinates (X, Y) and the width W are directly used as the center position and the width of a related line segment. The other data pieces are set as follows. The relative speed VX is set to zero. The relative speed VY is set to a speed which multiplies the speed of the subject vehicle by −½. The data pieces representing the 16 previous center coordinates (X, Y) are made vacant or empty. The condition flag Fj is set to "0". The condition flag Fj indicates which of an undecided state, a recognition state, and an extrapolation state the related object label Bj is in. The condition flag Fj is set to any one of "0", "1" and "2" according to the state. During the creation of every object label Bj, the condition flag Fj is set to "0" indicating that the object label Bj is in the undecided state. The definition of every state will be described later.

Figure 6:
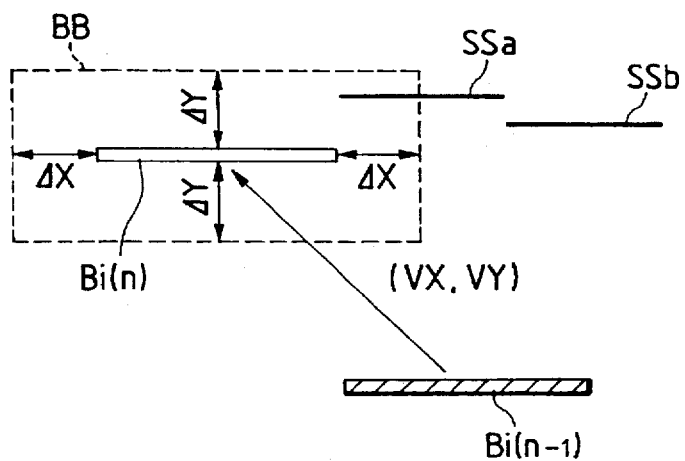
FIG. 6 is a diagram explaining definition of corresponding line segments in the preceding obstacle recognition routine.

In the case where the step 107 determines that at least one object label Bi is present, i.e., in the case where a YES answer is obtained in the step 107, the program advances to a step 121. The step 121 detects a line segment corresponding to the object label Bi. The definition of a line segment corresponding to the object label Bi will be described below. It is assumed that, as shown in FIG. 6, the position represented by the object label Bi moves from the previous position Bi(n−1) to a position (an estimated position) Bi(n) at a relative speed (VX, VY) where the position Bi(n−1) is provided in the last execution cycle of the program. After the calculation of the estimated position Bi(n), an estimated moving area BB is set around the estimated position Bi(n). The estimated moving area BB has a given dimension $\Delta X$ along the X-axis direction and a given dimension $\Delta Y$ along the Y-axis direction. In this case, a line segment SSa at least partially in the estimated moving range Bb is defined as corresponding to the object label Bi, whereas a line segment SSb fully outside the estimated moving range BB is defined as not corresponding to the object label Bi. The given dimensions $\Delta X$ and $\Delta Y$ are set as follows.

When the object label Bi is in the undecided state (Fi=0), the given dimension $\Delta X$ is set to 2.5 m while the given dimension $\Delta Y$ is set to 5.0 m.

When the object label Bi is in the recognition state (Fi=1) and the time elapsed since the appearance of the object label Bi corresponds to less than six execution cycles of the program, the given dimension $\Delta X$ is set to 2.0 m while the given dimension $\Delta Y$ is set to 4.0 m.

When the object label Bi is in the recognition state (Fi=1) and the time elapsed since the appearance of the object label Bi corresponds to six or more execution cycles of the program, or when the object label Bi is in the extrapolation state (Fi=2), the given dimension $\Delta X$ is set to 1.5 m while the given dimension $\Delta Y$ is set to 3.0 m.

In the case where a plurality of line segments at least partially in the estimated moving range BB are detected, the step 121 selects one of the line segments as corresponding to the object label Bi in a manner described below.

Figure 7A:
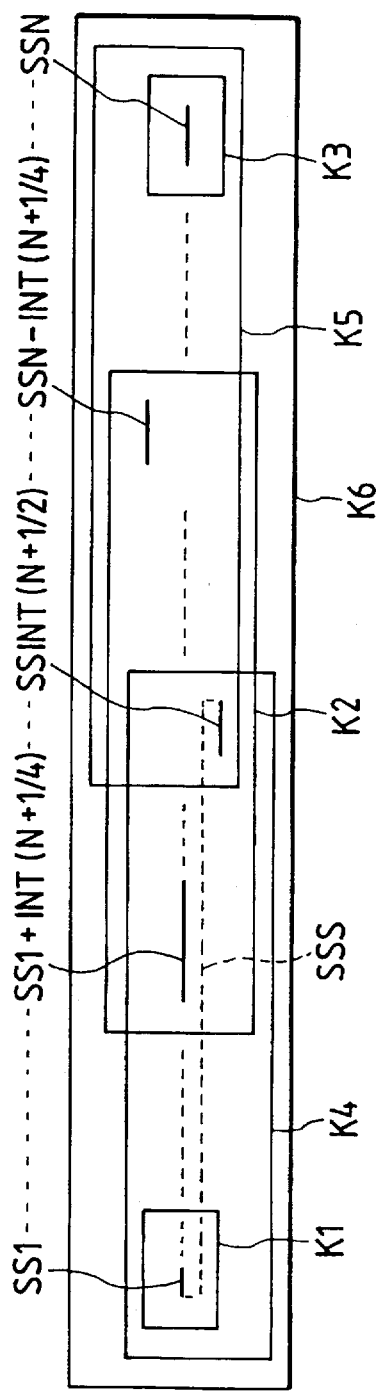
FIGS. 7A and 7B are diagrams explaining selection of the corresponding line segments in the preceding obstacle recognition routine.

FIG. 7A is a diagram explaining how to select one of the line segments from N line segments at least partially in the estimated moving range BB. Numbers SS1, SS2, . . . , SSN are sequentially assigned to the N line segments in the order of the positions of the line segments in the direction from the left to the right. Then, five line segments SS1, SS1+INT(N+¼), SSINT(N+½), SSN-INT(N+¼), and SSN are selected from among the N line segments SS1, SS2, . . . , SSN. Here, INT(N+¼) means INT{(N+1)/4}. In addition, "INT" means an operator denoting the integer part of the numerical value in the subsequent parentheses. For example, in the case of N=10, INT(N+¼) and INT(N+½) are calculated as follows.

$$INT(1¼)=INT(2.75)=2$$

$$INT(1½)=INT(5.5)=5$$

Accordingly, in this case, the line segments SS1, SS3, SS5, SS8 and SS10 are selected. Subsequently, as shown in FIG. 7A, six candidates K1 to K6 are created on the basis of the five selected line segments. The candidate K1 is composed of only the line segment SS1. The candidate K2 is composed of the line segments SS1+INT(N+¼) to SSN-INT(N+¼). The candidate K3 is composed of only the line segment SSN. The candidate K4 is composed of the line segments SS1 to SSINT(N+½). The candidate K5 is composed of the line segments SSINT(N+½) to SSN. The candidate K6 is composed of all the line segments SS1 to SSN.

The line segments SS in each of the candidates K1 to K6 are united as follows. At first, there is provided a new line segment having a width which extends between the left-hand end point and the right-hand end point of the combination of the line segments related to the candidates K1 to K6. The Y coordinate of the center of the new line segment is equal to the mean or average value which results from weighting the Y coordinates of the line segments SS using the widths of the line segments SS as weighting factors.

Then, the center coordinates and the width of the new line segment are compared with the center coordinates and the width of the object label Bi at the estimated position Bi(n), and hence an X-direction difference $\Delta X$, a Y-direction difference $\Delta Y$, and a width difference $\Delta W$ therebetween are evaluated by referring to the following performance index:

$$\alpha \Delta X + \beta \Delta Y + \gamma \Delta W,$$

where "$\alpha$", "$\beta$" and "$\gamma$" denote coefficients predetermined in accordance with characteristics of the distance/angle measuring device 3. In case of the vehicle control system 1, "$\alpha$" and "$\gamma$" are set to 1 and "$\beta$" is set to 0.3. The above performance index is calculated for the candidates K1 to K6, respectively. The six performance indexes are compared with each other, and one of the candidates K1 to K6 is selected which corresponds to the minimum performance index. Thus, the center coordinates and the width related to the selected candidate are used as the center coordinates and the width of the line segment corresponding to the object label Bi. With reference to FIG. 7A, for example, when the candidate K4 is selected from among the candidates K1 to K6, the line segment SSS is used as a line segment corresponding to the object label Bi. After the selection of the line segment corresponding to the object label Bi has been completed, the other line segments at least partially in the estimated moving range BB are regarded as not corresponding to the object label Bi. The above-indicated processing by the step 121 makes it possible to accurately judge whether or not a line segment currently recognized by the step 103 is the same as a previously-recognized line segment.

Figure 7B:
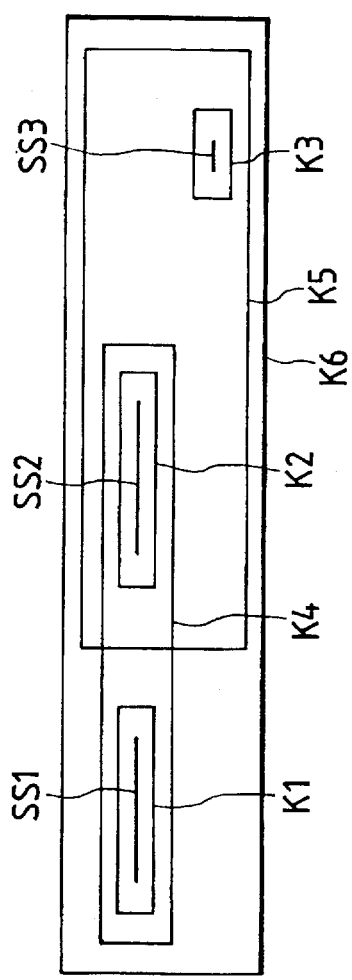

In the case where the number of line segments at least partially in the estimated moving range BB is between 2 and 4, duplicate use of line segments is permitted in the five line segments SS1 to SSN so that six candidates can be created as well. For example, in the case of N=3, INT{(N+1)/4}=1 and INT{(N+1)/2}=2, so that the line segments SS1, SS2, SS2, SS2 and SS3 are selected as the five line segments. In this case, as shown in FIG. 7B, the candidate K2 is composed of only the line segment SS2. The candidate K4 is composed of the line segments SS1 and SS2. The candidate K5 is composed of the line segments SS2 and SS3.

Steps 123 and 124 following the step 121 execute update of the object label Bi and judgment of error recognition, respectively. Then, after the variable "i" is incremented in a step 125, the program returns to the step 107.

Figure 8:
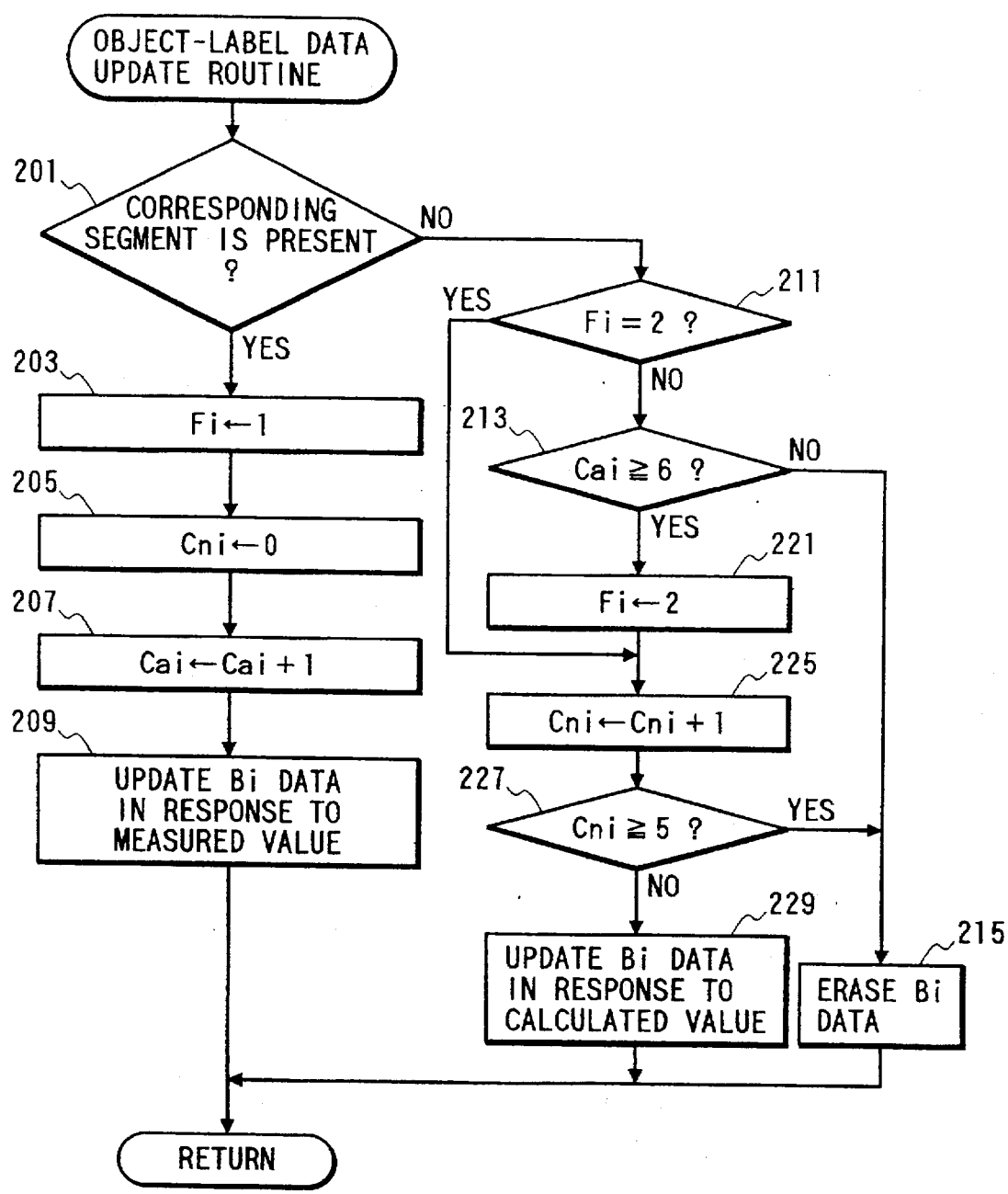
FIG. 8 is a flowchart showing a data update routine for updating an object label data in the preceding obstacle recognition routine.

FIG. 8 is a flowchart showing an object-label data update routine for updating the object label Bi. This routine has a first step 201 which follows the step 121 in FIG. 4. The step 201 determines whether or not the preceding step 121 has detected the line segment corresponding to the object label Bi. In the case where the line segment corresponding to the object label Bi has been detected, i.e., in the case where a YES answer is obtained in the step 201, the object label Bi is considered to be in the recognition state. In this case, the program advances from the step 201 to a step 203. The step 203 sets the condition flag Fi to "1". A step 205 following the step 203 resets a value Cni to "0". The value Cni denotes a counter which serves to count the number of times the line segment corresponding to the object label Bi has not been detected by the step 121. A step 207 following the step 205 increments a value Cai by one. The value Cai denotes a counter which serves to count the number of times the line segment corresponding to the object label Bi has been detected by the step 121. A step 209 following the step 207 updates the data in the object label Bi in response to the data representing the line segment corresponding to the object label Bi. After the step 209, the program returns to the main routine.

The function of the step 209, i.e., the data updating processing will now be described in more detail. As previously described, the line segment corresponding to the object label Bi includes a data piece representing the center coordinates and a data piece representing the width. The data piece representing the center coordinates is denoted by (Xs, Ys) while the data piece representing the width is denoted by Ws. Therefore, new center coordinates and width represented by the object label Bi are set equal to the center coordinates (Xs, Ys) and the width Ws, respectively. In addition, new relative speeds (VX, VY) represented by the object label Bi are set by referring to the following equation:

$$(VX, VY) = \left( \frac{Xs - Xk}{dt}, \frac{Ys - Yk}{dt} \right)$$

where (Xk, Yk) denotes a data piece representing the center coordinates of which the time elapsed since the moment of the measurement is closest to 1.0 sec. among the previous center coordinates represented by the object label Bi (as previously described, the maximum time during which the data is provided in the object label Bi is set to 0.128×16=2 sec. or less), and "dt" denotes the time elapsed since the moment of the measurement of the center coordinates. The update processing is thus performed in view of the fact that the line segment corresponding to the object label Bi matches with the obstacle represented by the object label Bi.

In the case where the line segment corresponding to the object label Bi has not been detected by the step 201, i.e., in the case where a NO answer is obtained in the step 201, the program advances from the step 201 to a step 211. The step 211 determines whether or not the condition flag Fi in the object label Bi is "2". In other words, the step 211 determines whether or not the object label Bi is in the extrapolation state. If the program advances to the step 211 for the first time, the condition flag Fi in the object label Bi is "0" or "1", so that the step 211 determines that the condition flag Fi in the object label Bi is not "2". After the step 211, the program sequentially advances to a step 213. The step 213 determines whether or not the counter value Cai is 6 or more. In the case the counter value Cai is smaller than "6", i.e., in the case a No answer is obtained in the step 213, the program advances from the step 213 to a step 215. The step 215 erases all the data pieces related to the object label Bi. After the step 215, the program returns to the main routine. While the line segment corresponding to the object label Bi remains successively detected, the sequence of the steps 201 to 209 are periodically executed, so that the counter Cai continues to be incremented by the step 207. In other words, when the line segment corresponding to the object label Bi disappears after five or less execution cycles of this program portion after the appearance thereof, all the data pieces related to the object label Bi are erased by the step 215. It is thus possible to erase the data pieces of the object label Bi corresponding to a temporarily-detected obstacle. Such a temporarily-detected obstacle generally agrees with a negligible road-side thing, and hence the erasion of the data pieces causes an increase in the accuracy of the recognition of an obstacle (corresponding to the object label Bi) to be considered.

In the case where a YES answer is obtained in the step 213, i.e., in the case where the line segment corresponding to the object label Bi disappears after six or more execution cycles of this program portion, the program advances from the step 213 to a step 221. The step 221 regards the object label Bi as being in the extrapolation state, and sets the condition flag Fi in the object label Bi to "2". After the step 221, the program advances to a step 225. The step 225 increments the counter value Cni by one. A step 227 following the step 225 determines whether or not the counter value Cni is 5 or more. When the counter value Cni is smaller than "5", the step 227 goes to NO. A step 229 following the step 227 updates the data in the object label Bi in response to calculated values. Specifically, the step 229 calculates new center coordinates (X, Y) represented by the object label Bi on the assumption that the previously-indicated relative speeds (VX, VY) and the previously-indicated width W are unchanged.

As described in the preceding paragraph, when the line segment corresponding to the object label Bi disappears after six or more execution cycles of this program portion, the step 221 sets the condition flag Fi in the object label Bi to "2" representing the extrapolation state. Then, the step 229 updates the data in the object label Bi in response to the calculated values. The program directly advances from the step 221 to the step 225, so that the counter Cni continues to be incremented by the step 225. On the other hand, in the case where the counter value Cni is 5 or more (the answer to the step 227 is YES), i.e., in the case where the line segment corresponding to the object label Bi disappears after five or more execution cycles of this program portion, the program advances from the step 227 to the step 215. The step 215 erases all the data related to the object label Bi. Therefore, even when an obstacle (corresponding to the object label Bi) disappears in an interval corresponding to less than five execution cycles, if it appears again at the step 201 (the answer to the step 201 becomes YES) and continues to be detected during six or more execution cycles of this program portion, the obstacle is regarded as corresponding to the same object label Bi. It is thus possible to continue to detect such an obstacle.

Figure 9:
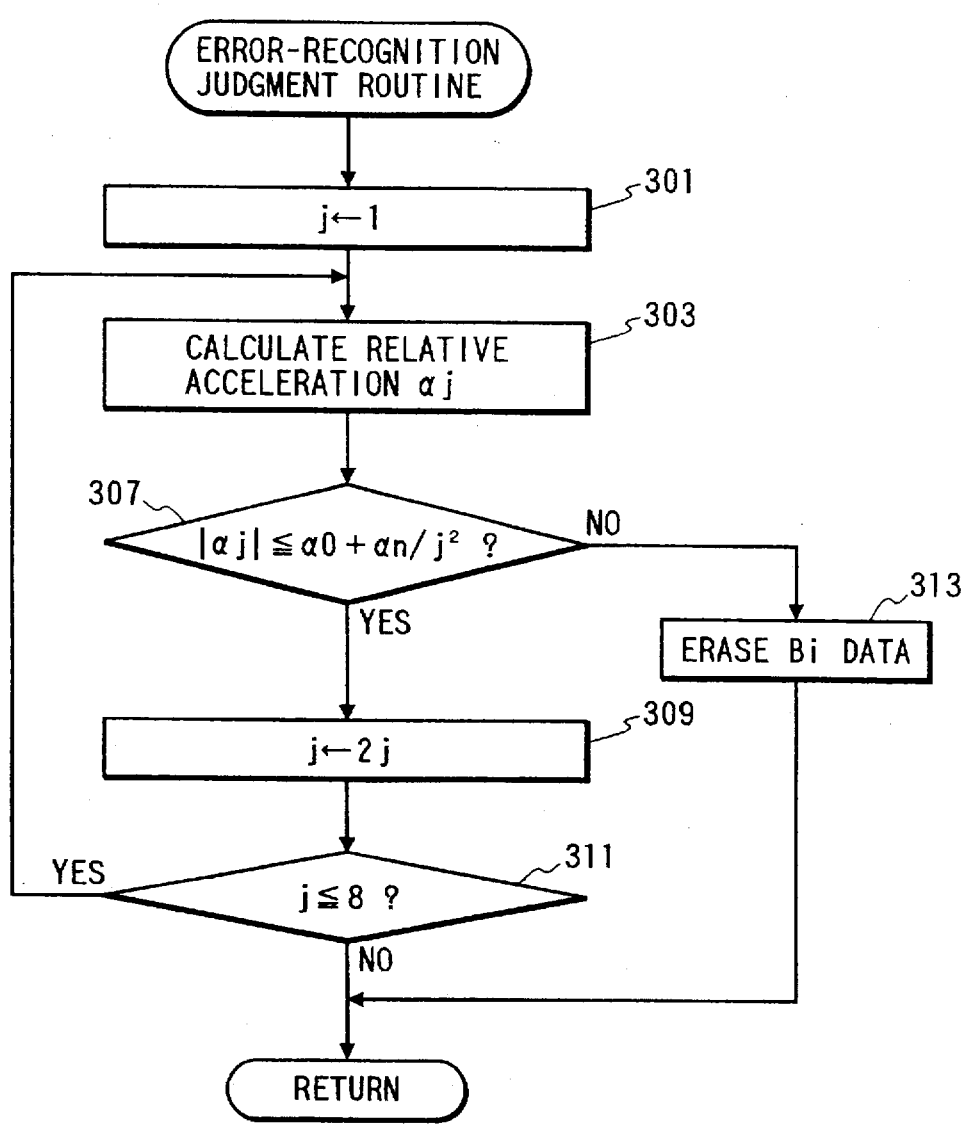
FIG. 9 is a flowchart showing an error-recognition judgment routine in the preceding obstacle recognition routine.

FIG. 9 is a flowchart showing an error-recognition judgment routine.. This routine has a first step 301 which follows the step 124 in FIG. 4. The step 301 set a variable "j" to 1. After the step 301, the program advances to a step 303. The step 303 calculates a relative acceleration α j of the object label Bi by referring to the following equation:

$$\alpha j = \frac{\frac{Y_s - Y_{s-j}}{j \cdot \Delta t} - \frac{Y_{s-j} - Y_{s-2j}}{j \cdot \Delta t}}{j \cdot \Delta t}$$
$$= \frac{Y_s + Y_{s-2j} - 2Y_{s-j}}{j^2 \cdot \Delta t^2}$$

where "Ys" denotes a Y coordinate of the current object label Bi, "Ys-j" denotes a Y coordinate of the object label Bi detected j times before, and Δ t denotes one cycle of detection of the object label Bi, for example, 128 ms. When the previously-detected data of the object label Bi related to the Y coordinate is not enough to calculate the relative acceleration α j of the object label Bi, the relative acceleration is set to "0".

A step 307 following the step 303 determines whether or not an absolute value of the calculated relative acceleration α j is equal to or less than "α 0+α n/j$^2$". Here, "α 0" and "an" are given constants respectively. For example, "α 0" is set equal to 10 m/s$^2$ and "α n" is set equal to 120 m/s$^2$. In the case where the absolute value of the calculated relative acceleration α j is equal to or less than "α 0+an/j$^2$", i.e., in the case where a YES answer is obtained in the step 307, the program advances to a step 309. The step 309 sets "j" to a numerical value which is multiplied by 2. After the step 309, the program advances to a step 311. The step 311 determines whether or not "j" is eight or less. When "j" is equal to eight or less, i.e., a YES answer is obtained in the step 311, the program returns to the step 303. Then, the sequence of steps 303 to 311 are repeatedly executed. In four execution cycles of this program portion, "j" becomes 16 in excess of 8, so that a NO answer is obtained in the step 311. After that, the program returns to the main routine.

On the other hand, in the case where the absolute value of the relative acceleration α j exceeds α 0+α n/j$^2$ in an interval corresponding to three or less execution cycles of this program portion, the program advances from the step 307 to a step 313. The step 313 erases all the data related to the object label Bi. After the step 313, the program returns to the main routine. It is thus possible to erase the data related to a negligible road-side thing erroneously recognized as an obstacle corresponding to the object label Bi. Such data related to the negligible road-side thing are erased as follows.

Figure 10A:
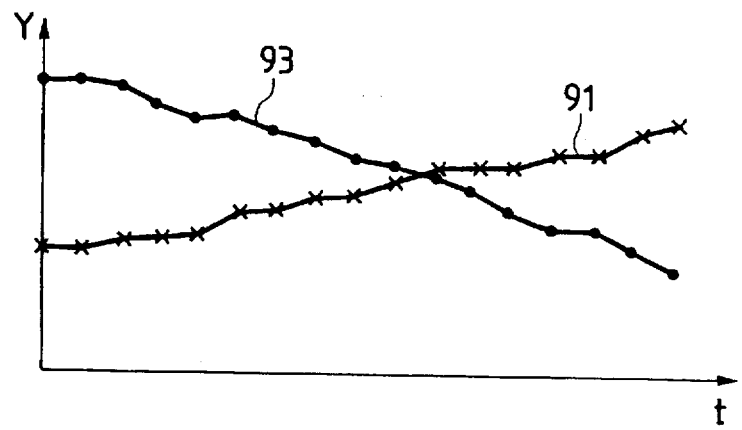
FIGS. 10A and 10B are graphs explaining how the error recognition is judged in the error-recognition judgment routine.

As shown in FIG. 10A, when a preceding vehicle is recognized as an obstacle corresponding to the object label Bi, the Y coordinate represented by the object Bi changes with time relatively in a gentle way. In FIG. 10A, a curve 91 represents a case where the object label Bi corresponds to a preceding vehicle which gradually goes away from the subject vehicle while a curve 93 represents a case where the object label Bi corresponds to a preceding vehicle which is approaching the subject vehicle. In this case, the absolute value of the relative acceleration α j is equal to or less than α 0+α n/j$^2$. The condition provided by the step 307 is thus satisfied.

Figure 10B:
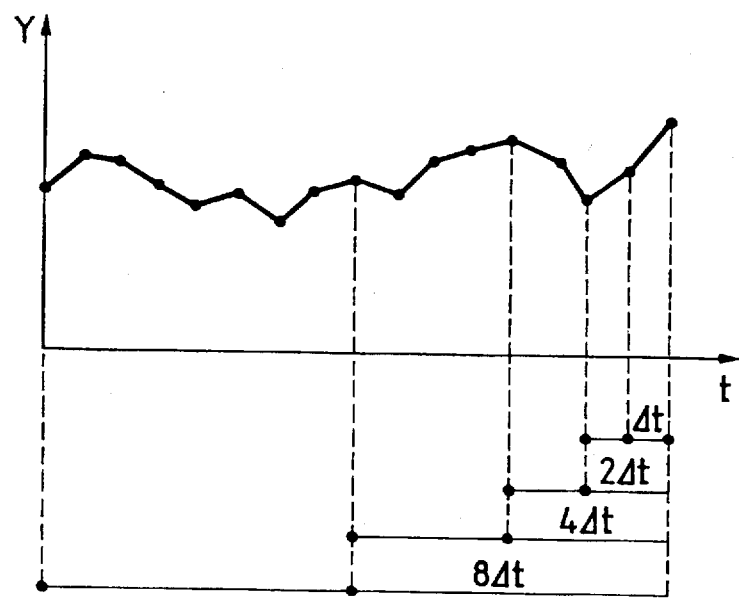

On the other hand, when a road-side thing is recognized as an obstacle corresponding to the object label Bi, as shown in FIG. 10B, the Y coordinate represented by the object Bi changes with time irregularly or unpredictably. For example, in the case where a plurality of reflectors are arranged on a road shoulder with a given space, when the speed of the subject vehicle becomes substantially equal to a numerical value which is obtained by dividing a scanning cycle of the transmitting/receiving section 31 into the given space between the reflectors, the reflectors are erroneously recognized as if it were an object. In this case, the Y coordinate represented by the object label Bi tends to change with time irregularly as shown in FIG. 10B. Therefore, the absolute value of the relative acceleration α j may exceed α 0+α n/j$^2$. If such a condition is established, i.e., when a NO answer is obtained in the step 307, the object label Bi is regarded as corresponding to an erroneously-recognized object such as a thing on the road shoulder, so that the step 313 erases all the data related the object label Bi but the center coordinates which are memorized as data pieces representing erroneously-recognized object.

Returning to FIG. 4, after all the object label Bi (i=1, 2, . . .) have been updated by executing the sequence of the steps 107, 121, 123, 124 and 125, the object label Bi corresponding to the number "i" incremented last by the step 125 is absent. Therefore, a NO answer is obtained in the step 107 and the program advances from the step 107 to the step 111. In the case where no line segment corresponds to any one of the object labels Bi, i.e., in the case where a YES answer is obtained in the step 111, the program advances to the step 113. The step 113 sequentially creates new object labels Bj with respect to the line segments to which corresponding object labels have not yet been given. In addition, the new object labels Bj are created in the order of from the line segment having the smallest number "j". After the step 113, the current execution cycle of the program portion ends and the program returns to the main routine. On the other hand, in the case where all the line segments correspond to any ones of the object labels Bi, respectively, i.e., in the case where a NO answer is obtained in the step 111, the current execution cycle of the program portion ends without creating the new object labels Bj.

Returning to FIG. 2, a step 403 following the step 102 executes a correction-time counter setting routine for setting a correction time counter. As described later, the correction time counter is used as a condition provided by a step 423. The correction-time counter setting routine is executed as follow. In the case where the object label Bi corresponding to an identical stationary object is recognized plural times, a curvature radius R of a curved road on which the subject vehicle is traveling is calculated on the basis of data representing the object label Bi. During calculation of the curvature radius, it is determined whether the object label Bi corresponds to a stationary object or a moving object on the basis of the speed of the subject vehicle and the speed of the object label Bi relative to the subject vehicle by using a well-known processing method. When a plurality of stationary objects are detected, a plurality of curvature radii R are calculated for the respective stationary objects, and an absolute value of the minimum curvature radius is selected from among the calculated curvature radii R.

Figure 11:
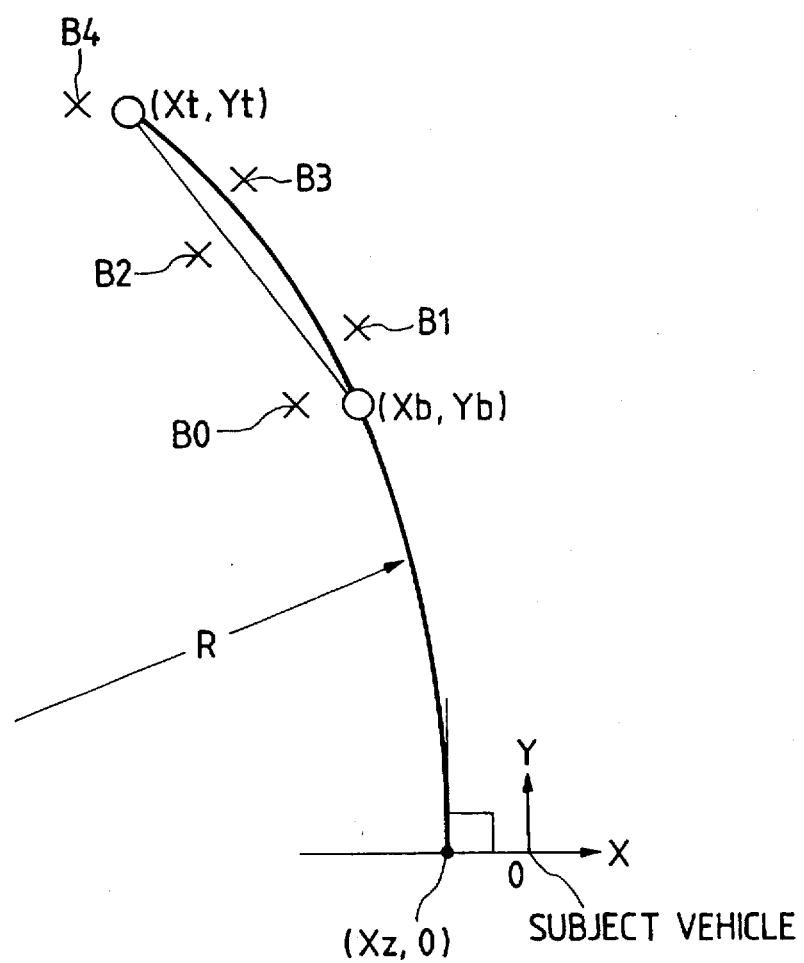
FIG. 11 is a diagram explaining calculation of a curvature radius of a road in the obstacle warning operation.

As shown in FIG. 11, the curvature radius is defined in the following three steps (1) to (3). In FIG. 11, it is assumed that five loci B0 to B4 of the identical stationary object recognized by the step 101 are obtained at respective regular time intervals.

Figure 12:
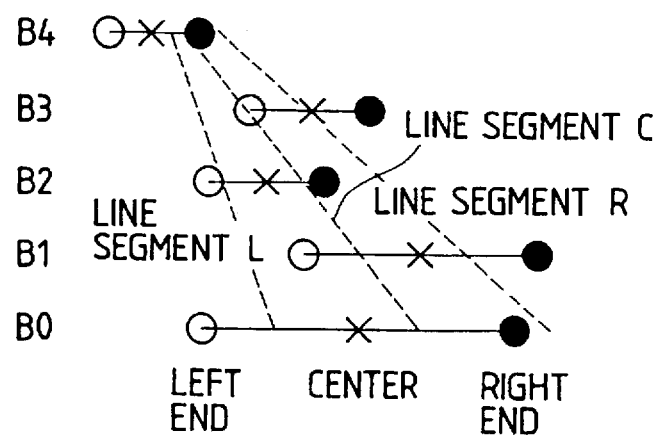
FIG. 12 is a diagram explaining selection of points to be used for the calculation of the curvature radius.

(1) Selection of five loci to be used for calculating a curvature radius R (a) As shown in FIG. 12, coordinates of left ends, centers, and right ends are calculated for the five loci B0 to B4 obtained at the respective regular time intervals. In FIG. 12, the coordinates of left ends are marked with circles, the center coordinates are marked with crosses, and the coordinates of right ends are marked with blackened circles, respectively.

(b) The left ends, the centers, and the right ends of the five loci B0 to B4 are joined by three line segments (X=aY+b) defined using the method of least squares, as indicated by broken lines L, C and R in FIG. 12.

(c) The square of a difference between the line segment L and the left end of each of the loci B0 to B4 is calculated. Similarly, the square of a difference between the line segment C and the center of each of the loci B0 to B4 is calculated. The square of a difference between the line segment R and the right end of each of the loci B0 to B4 is also calculated. For the left ends, the centers, and the right ends, total values St of the squares are determined, respectively, according to the following equation:

$$St=\Sigma\{(aYj+b-Yj)\cdot(aYj+b-Xj)\},$$

where (Xj, Yj) denotes each of the coordinates of the left ends, the centers, and the right ends, respectively, corresponding to a locus Bj.

(d) From among the left ends, the centers, and the right ends of the loci B0 to B4, five points representing the smallest of the total values St provided by (c) are selected, and their coordinates are used to determine the curvature radius R. In other words, each point is selected from any one of the left end, the center, and the right end of each of the five loci B1 to B4 of the stationary object. However, if the X coordinate of the centers is smaller than −2 m, the right ends will be selected, while if the X coordinates of the centers is larger than 2 m, the left ends will be selected.

(2) Line segment approximation of the loci

As shown in FIG. 11, coordinates (Xt, Yt) and (Xb, Yb) of both ends of one of the line segments L, C and R provided by (b) in the step (1) are determined from the five points selected by (d) in the step (1).

(3) Calculation of the curvature radius R

The curvature radius R is determined by solving the following simultaneous equations using the coordinates (Xt, Yt) and (Xb, Yb) provided by the step (2).

$$Xt-Xz=Yt\cdot Yt/2R$$

$$Xb-Xz=Yb\cdot Yb/2R$$

An equation of circle is defined by an arc extending through the two points (Xt, Yt) and (Xb, Yb), intersecting at the point (X, 0) the X-axis passing through the center of the subject vehicle. The equation of circle also approximates a parabola under the condition that $$|x|<<|Y| \text{ and } |x|<<|R|.$$

Figure 13:
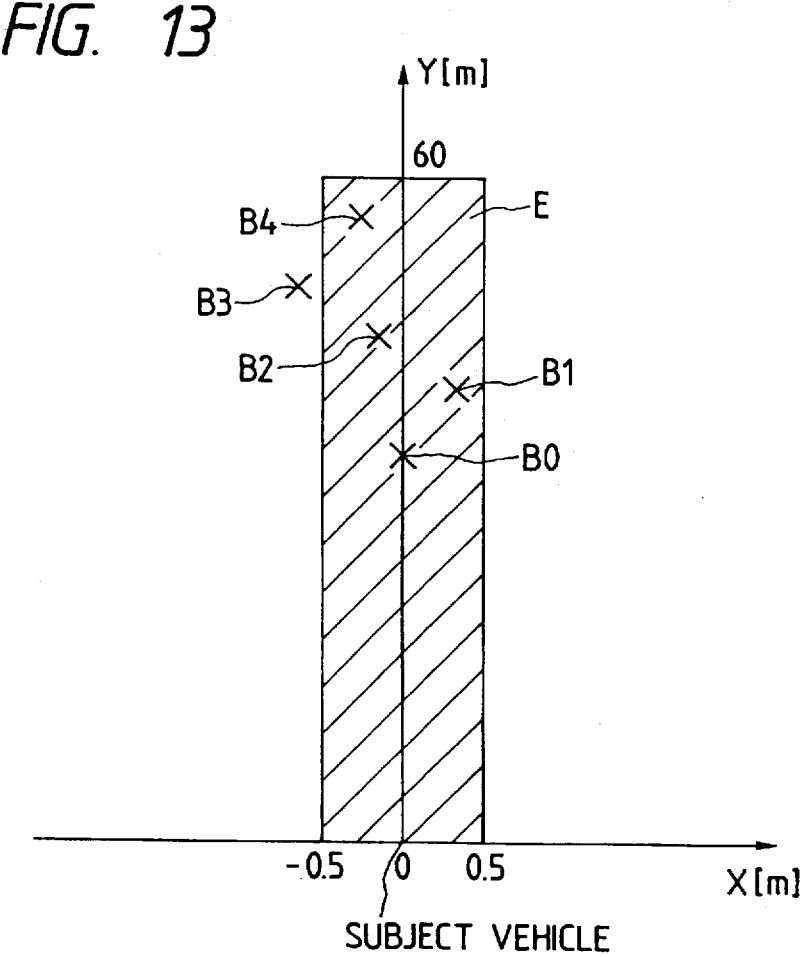
FIG. 13 is a diagram explaining exception to the calculation of the curvature radius.

However, as shown in FIG. 13, if the locus B0 with the smallest Y-coordinate and the locus B4 with the largest Y-coordinate exist within a zone E (|x|<0.5 m, 0<Y<60 m), the curvature radius R is defined as infinity (R=∞) without performing the above calculation.

The following setting conditions may add a value to the correction time counter. The correction time counter is configured to reduce its value to 0 sec. gradually with time during the execution cycle of the electronic control circuit 5.

(1) Speed of the subject vehicle >35 km/h, and |R|<200 m

When the above condition (1) is satisfied, the subject vehicle is regarded as being traveling a sharp curve, so that 2.0 seconds are added to the correction time counter. It should be noted that this condition cannot be applied again during a 10 second interval since the condition is applied.

(2) Speed of the subject vehicle >20 km/h, |R|<400 m, and lateral G≧0.06 G

When the above condition (2) is satisfied twice during a 20 second interval, and when the second-time curve is opposite to the first-time curve, the subject vehicle is regarded as being traveling consecutive curves, so that 2.0 seconds are added to the correction time counter. In this case, the lateral G denotes a gravity accelerated in the width direction of the subject vehicle, which is given by solving the following equation.

$$a=V^2/R \text{ (m/s}^2\text{)}$$

(3) When the center coordinates of at least one guardrail data satisfy the condition that |x|<1.0 m and |Y|<40 m, a guardrail is regarded as being present immediately ahead of the subject vehicle, so that a second is added to the correction time counter.

Figure 14:
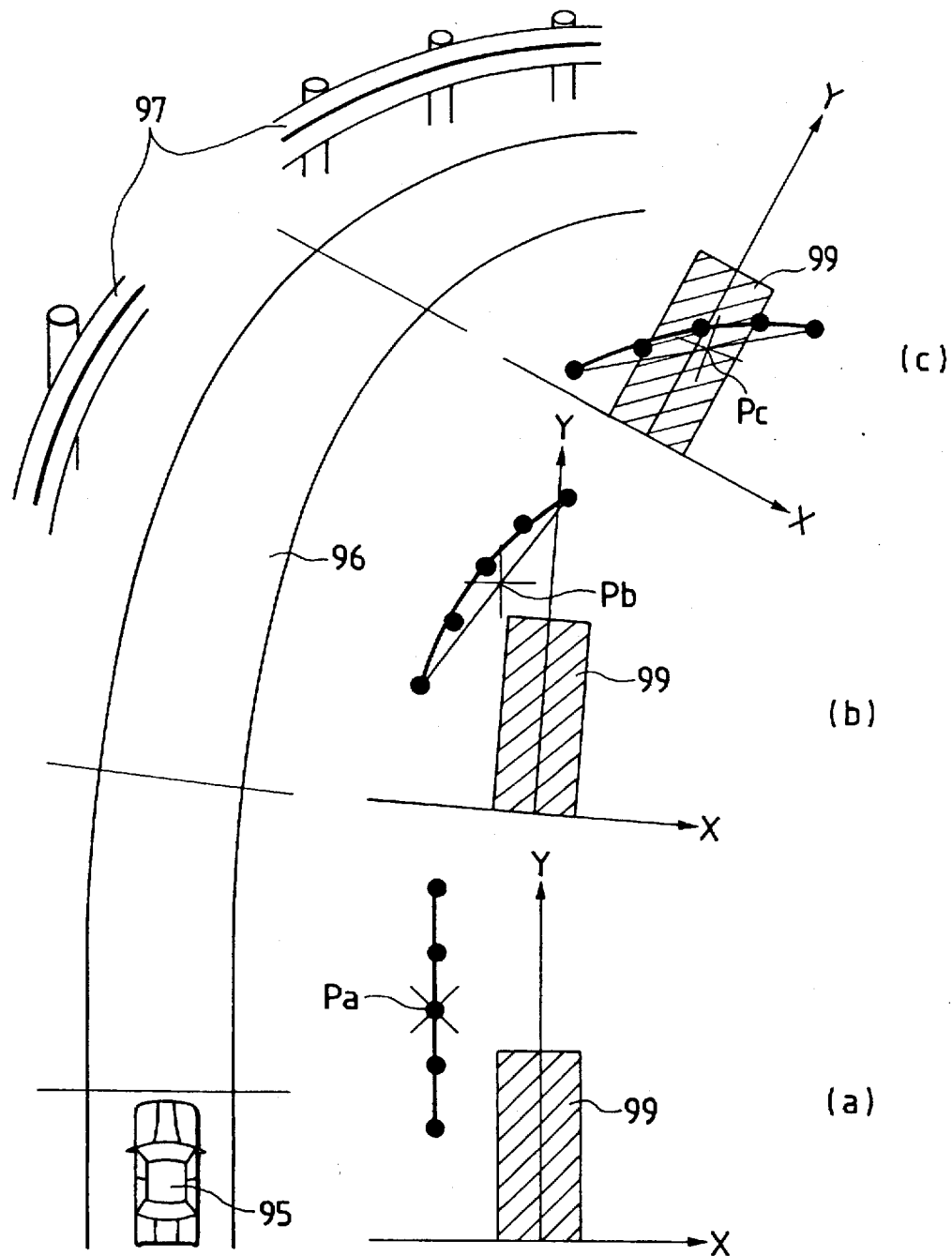
FIG. 14 is an illustration explaining an example of sharp curve judgment in the obstacle warning operation.

Referring to FIG. 14, the condition (3) will be described below. FIG. 14 illustrates a case where the distance/angle measuring device 3 is detecting a reflected light beam from a guardrail 97 while a subject vehicle 95 travels a curved road 96. At a stage (a) where the subject vehicle 95 is traveling a straight section of the road 96, the guardrail data representing the guardrail 97 is parallel to the Y coordinate of the subject vehicle 95, and the center coordinates Pa of the guardrail data does not fall into a range 99 of the above condition (|x|<1.0 m, |Y|<40 m). At a stage (b) where the subject vehicle 95 gradually approaches a gentle curve section of the road 96, the guardrail data is not parallel to the Y coordinate of the subject vehicle 95, but the center coordinates Pb of the guardrail data has not yet fall into the range 99 although comes close to the range. In contrast, at a stage (c) where the subject vehicle 95 has entered a sharp curve section of the road 96, the center coordinates Pc fall into the range 99. The step (3) thus detects a sharp curve and adds the correction time counter value.

(4) When the center coordinates of at least one erroneously-recognized object data provided by the step 313 satisfy the condition that |x|<1.0 m and |Y|<40 m, a road-side thing such as a reflector is regarded as being present immediately ahead of the subject vehicle, so that ten seconds are added to the correction time counter value.

(5) When a given number of or more obstacles are recognized as object labels Bi, where "i" denotes a natural number, for example, when ten obstacles are present, a plurality of road-side things are regarded as being included in the object labels Bi corresponding to the obstacles, so that a second is added to the correction time counter.

After setting a value of the correction time counter on the basis of any one of the above conditions (1) to (5), the program advances to a step 405. The step 405 sets a variable "i" to 0. A step 407 following the step 405 increments the variable "i". After the step 407, the program advances to a step 409. The step 409 determines whether or not there is possibility of collision between the subject vehicle and an obstacle represented by the current object label Bi (collision judgment) in a manner described below.

Figure 15:
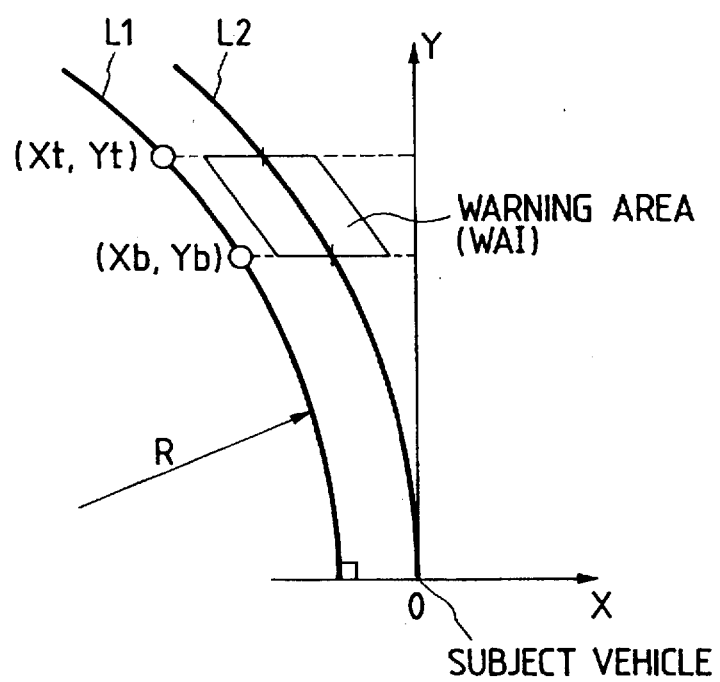
FIG. 15 is a diagram explaining setting of a warning area in the obstacle warning operation.

In the case where the object label Bi corresponds to a stationary object, a warning area WAI is set by using a curvature radius R calculated from the object label Bi by the step 403. Even when the object label Bi corresponds to a moving object, the curvature radius R representing the path of the object label Bi is calculated in the same manner so that the warning area WAI can be set. As shown in FIG. 15, the warning area WAI is set as follows. When the curvature radius R provided by the step 403 is represented by an arc L1, a concentric arc L2 is defined such as passing through the center of the subject vehicle along the longitudinal direction. The starting and ending locations in the Y-axis direction of the warning area WAI are determined by the points (Xt, Yt) and (Xb, Yb) of both ends of the guardrail data, while the lateral range of the warning area WAI are set at both sides of the arc L2 by a width of ±1 m. In addition, the warning area WAI is made to approximate to a parallelogram. Four vertices of the parallelogram are determined by parallelogram approximation according to the following equation.

$$\left(\frac{Yt^2}{2R} \pm 1, Yt\right)\left(\frac{Yb^2}{2R} \pm 1, Yb\right)$$

The warning area WAI provided such above is used for the collision judgment. In other words, the step 409 determines whether or not there is possibility of collision between the subject vehicle and the obstacle represented by the current object label Bi by determining whether or not the object label Bi exists within the warning area WAI for a given time interval.

Figure 16A:
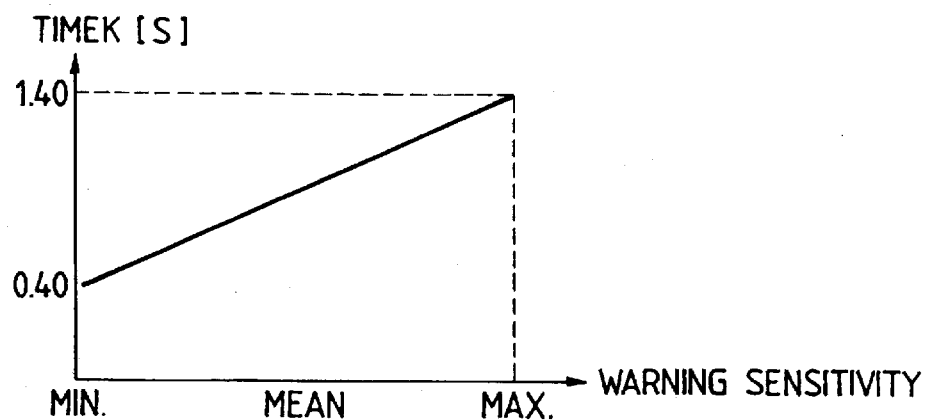
FIGS. 16A, 16B and 16C are graphs each showing the relation between a constant for calculating a moving object warning distance and a warning sensitivity.
Figure 16B:
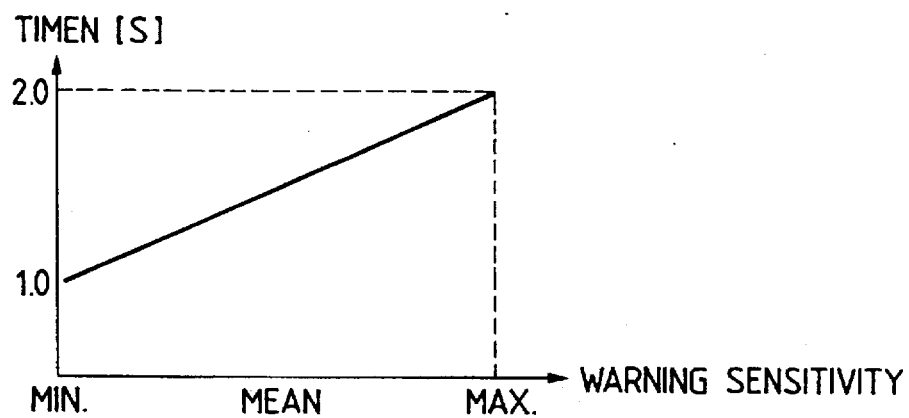
Figure 16C:
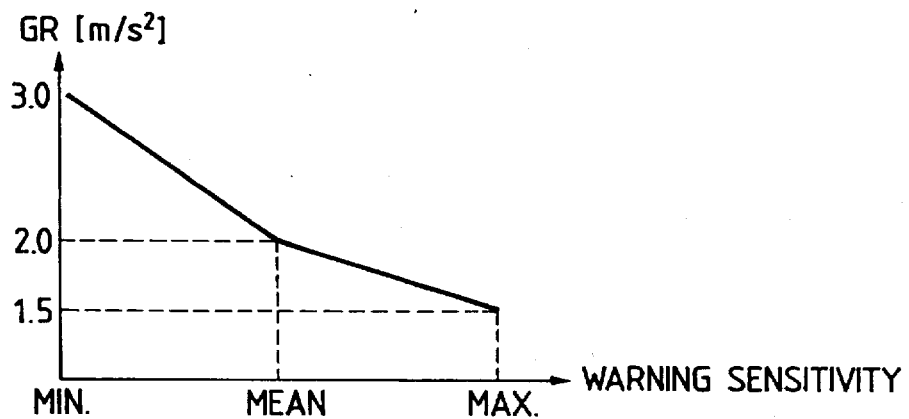

A step 411 following the step 409 refers to the determination provided by the step 409. In the case where there is possibility of collision, i.e., in the case where a YES answer is obtained in the step 411, the program advances to a step 413. The step 413 determines whether the object label Bi corresponds to a stationary object or a moving object on the basis of the speed of the subject vehicle and the speed of the object label Bi relative to the subject vehicle. When the step 413 determines that the object label Bi corresponds to a moving object, the program advances to a step 415. The step 415 calculates a warning distance to the moving object by solving the following equation:

$$OFFSET+VR \times TIMEK-VRR \times TIMEN+VRR^2/2GR,$$

where "VR" denotes a speed (m/s) of the subject vehicle, "VRR" denotes a relative speed (m/s) of the moving object under the condition that a direction away from the subject vehicle is positive, "OFFSET" denotes a constant, for example, 3.0 m, and "TIMEK", "TIMEN, and "GR" denote constants determined by the warning sensitivity (see FIGS. 16A, 16B and 16C).

Figure 17A:
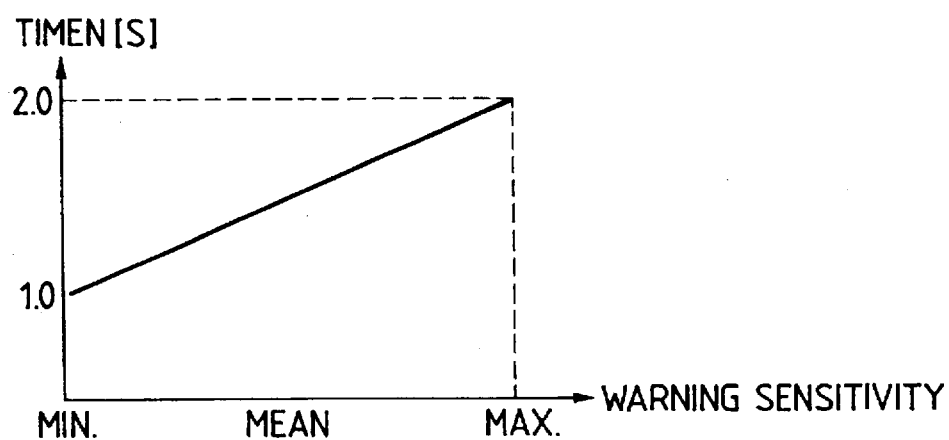
FIGS. 17A and 17B are graphs each showing the relation between a constant for calculating a stationary object warning distance and a warning sensitivity.
Figure 17B:
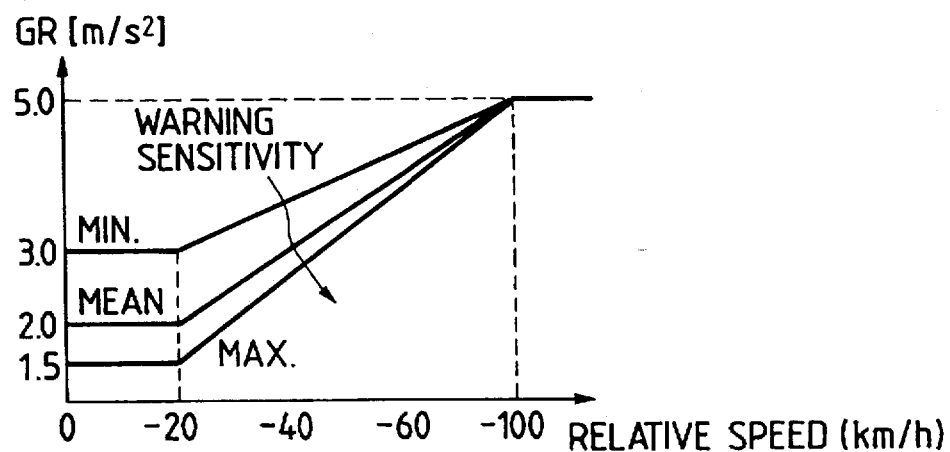
Figure 18:
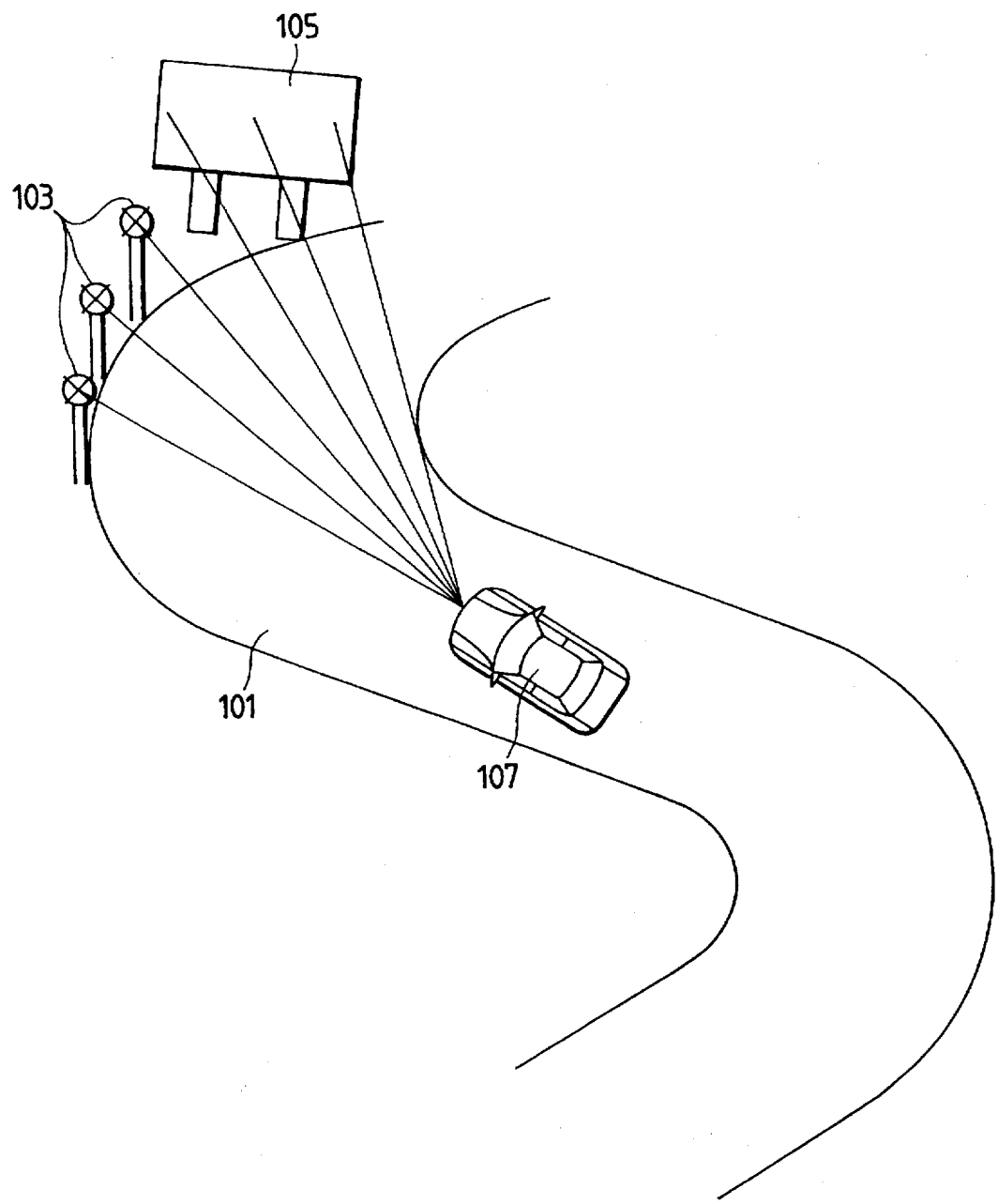
FIG. 18 is an illustration explaining an example of a prior art problem.
Figure 19:
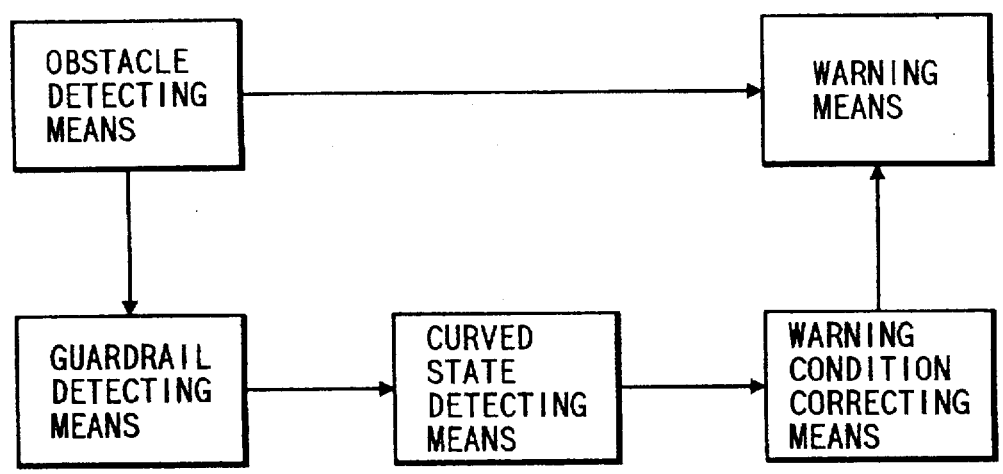
FIG. 19 is a block diagram of an exemplary structure of the present invention.

On the other hand, when the step 413 determines that the object label Bi corresponds to a stationary object, the program advances to a step 421. The step 421 calculates a warning distance to the moving object by solving the following equation:

$$OFFSET-VRR \times TIMEN+VRR^2/2GR,$$

where "VRR" denotes a relative speed (m/s) of the stationary object under the condition that a direction away from the subject vehicle is positive, "OFFSET" denotes a constant, for example, 3.0 m, and "TIMEN and "GR" denote constants determined by the warning sensitivity (see FIG. 17).

The warning distance is set to a distance enough to brake down and stop the subject vehicle on this side of the obstacle. A step 423 following the step 421 determines whether or not the value of the correction time counter is larger than 0. When the value is equal to 0, i.e., when a NO answer is obtained in the step 423, the program jumps to a step 417. On the other hand, when the value is larger than 0, i.e., when a YES answer is obtained in the step 423, the program advances to the step 417 after correcting the warning distance in a step 425. The step 425 calculates the warning distance by solving the following equation.

$$\max\{(\text{speed of subject vehicle } [\text{km/h}] \times 0.7)[\text{m}], 30 \text{ [m]}\}$$

Then, the step 425 determines whether or not the value of the warning distance calculated here is smaller than the warning distance provided by the step 421. When the calculated value is smaller than the warning distance provided by the step 421, the warning distance is replaced by the value calculated in the step 425. Otherwise, the value provided by the step 421 is used as the warning distance. In both cases, the warning distance is to be set to a distance enough to brake down and stop the subject vehicle on this side of the object.

The sequential step 417 determines whether the object label Bi corresponds to a stationary object and the width W of the object label Bi does not correspond to the width of the subject vehicle (W≦1.0 m or W≧3.0 m). In the case where the object label Bi satisfies both conditions, the object label Bi is regarded as corresponding to a road-side thing. Therefore, the object label Bi is removed from the warning object data to be considered.

On the other hand, in the case where the object label Bi does not satisfy either or both of the conditions, i.e., in the case where a NO answer is obtained in the step 417, the program advances to a step 429. The step 429 determines whether or not the object vehicle Bi exists within a range of the warning distance provided by the step 415, 421 or 425. When the step 429 determines that the object label Bi exists within the range of the warning distance, i.e., when a YES answer is obtained in the step 429, the program advances to a step 431. The step 431 recognizes the object label Bi as a warning object. After the step 431, the program advances to a step 433. In the cases where the step 417 determines that the object label Bi satisfies the above conditions (and goes to YES), the step 429 determines that the object label Bi does not exist within the range of the warning distance (and goes to NO), and the step 411 determines, as previously described, that there is no possibility of collision with the object corresponding to the object label Bi (and goes to No), the object label Bi is not recognized as a warning object. In these cases, the program jumps to the step 433.

The step 433 determines whether at least one undecided object label Bi is present or absent. In the case where at least one unjudged object label Bi is present, i.e., in the case where a YES answer is obtained in the step 433, the program returns to the step 407 and the program portion after the step 407 is repeated. In other words, the step 407 increments "i" by one. After the step 407, the sequence of the steps 409 to 431 are executed. When this program portion is executed for all the object labels Bi, i.e., when a NO answer is obtained in the step 433, the program advances to a step 435. The step 435 determines whether at least one object label Bi recognized as the warning object is present or absent. In the case where at least one object label Bi recognized as the warning object is present, i.e., in the case where a YES answer is obtained in the step 435, the program advances to a step 437. The step 437 executes a warning process by actuating the alarm sound generator 9 on the basis of the setting of the alarm volume setting device 11. After the step 437, the current execution cycle of the program portion ends. On the other hand, in the case where there is no object label Bi recognized as the warning object, i.e., in the case where a NO answer is obtained in the step 435, the program advances to a step 441. The step 441 determines whether or not the alarm remains generated. When the alarm remains generated, i.e., when a YES answer is obtained in the step 442, the program advances to a step 443. The step 443 stops the alarm and the current execution cycle of the program portion ends. When no alarm is generated, i.e., when a NO answer is obtained in the step 441, the current execution cycle of the program portion immediately ends.

As described above, according to the vehicle control system 1, the step 403 sets the correction time counter on the basis of the curved state of the road, and steps 423 and 425 corrects the warning distance in response to the value of the correction time counter. When the current object label Bi exists within the range of the warning distance, i.e., when a YES answer is obtained in the step 429, the vehicle control system 1 issues an alarm in the step 437. It is thus possible to avoid an accident such as collision with or clash into a preceding vehicle.

Since the step 403 detects the curved state of the road on the basis of the curvature radius (conditions (1) and (2)), the position in which a guardrail is detected (condition (3)), the position in which an erroneously-recognized objected is detected (condition (4)), and the number of obstacles recognized as object labels Bi (condition (5)), the vehicle control system 1 enables remarkably accurate detection of the curved state, and hence accurate generation of the alarm, thereby avoiding a false alarm properly. In addition, the curved state is calculated on the basis of the distance to and angle of the obstacle detected by the distance/angle measuring device 3, so that means or device for detecting a steering angle or the like does not need to be provided in the system, thereby simplifying the system structure.

Further, the vehicle control system 1 is able to correct the warning distance to the stationary object which is susceptible to the curved state, so that the alarm can be generated more accurately. Furthermore, the vehicle control system 1 is able to remove road-side things from warning objects on the basis of the conditions that the object label Bi corresponds to a stationary object and the width W of the object label Bi does not correspond to the width of the subject vehicle (step 417), so that the alarm can be generated still more accurately, thereby avoiding a false alarm more properly.

The condition (3) for detecting the curved state can be also used in a case where only a guardrail is present on the road shoulder without a reflector. The other conditions can be used to a road-side thing even if there is no guardrail on the road shoulder. Therefore, the curved state can be detected properly as long as either the guardrail or the road-side thing such as the reflector is present on the road shoulder. It is thus possible to avoid a false alarm irrespective of the road type.

In the above embodiment, the step 104 corresponds to the guardrail detecting means, the step 403 corresponds to the curved state detecting means and the curvature radius calculating means, the steps 423 and 425 correspond to the warning condition correcting means, the step 303 corresponds to the acceleration calculating means, and the step 313 corresponds to the erroneously-recognized object detecting means, respectively. However, the present invention is not limited by the embodiment, and other embodiments or modification can be embodied without departing from the scope of the invention as set forth in the appended claims.

For example, the detection of the curved state can be executed by other type of means or on the basis of conditions other than the conditions (1) to (5) provided by the embodiment. Otherwise, part or parts of the conditions (1) to (5) may be used to detect the curved state. Further, although the embodiment is configured to correct the warning distance on the basis of whether or not the counter value is greater than 0, the correction may be performed such that the warning distance is gradually increased or decreased according to the counter value. Furthermore, the warning distance may be corrected without the counter value, for example, by setting up a flag when each of the conditions (1) to (5) is satisfied. Furthermore, although the embodiment is configured to correct the warning distance as a warning condition, other warning conditions may be corrected, such as the size of the object label corresponding to the warning object, or the approaching speed of the object label.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An obstacle warning system for a vehicle, comprising:
    obstacle detecting means for detecting a distance to an obstacle and an angle of the obstacle within a forward detection zone defined by a given angle in a width direction of the vehicle;
    warning means for issuing an alarm when the obstacle detected by said obstacle detecting means satisfies a given warning condition;
    guardrail detecting means for detecting a guardrail on the basis of the distance to the obstacle and the angle of the obstacle detected by said obstacle detecting means when the obstacle detected by said obstacle detecting means extends a long distance along a forward direction of the vehicle;
    curved state detecting means for detecting a curved state of a road on the basis of a position of the guardrail detected by said guardrail detecting means; and
    warning condition correcting means for correcting the warning condition on the basis of the curved state of the road detected by said curved state detecting means.

2. An obstacle warning system as set forth in claim 1, further comprising curvature radius calculating means for calculating a curvature radius from a path or a locus of the obstacle detected by said obstacle detecting means when the obstacle is substantially stationary, wherein said curved state detecting means detects the curved state on the basis of both the position of the guardrail detected by said guardrail detecting means and the curvature radius provided by said curvature radius calculating means.

3. An obstacle warning system as set forth in claim 1, wherein said curved state detecting means detects the curved state on the basis of both the position of the guardrail detected by said guardrail detecting means and whether or not a plurality of obstacles detected by said obstacle detecting means exceeds a given value.

4. An obstacle warning system as set forth in claim 1, further comprising:

acceleration calculating means for calculating a relative acceleration between the vehicle and the obstacle detected by said obstacle detecting means; and erroneously-recognized object detecting means for detecting and recognizing the obstacle as an erroneously-recognized object when the relative acceleration provided by said acceleration calculating means is out of a given range, wherein said curved state detecting means detects the curved state on the bases of both the position of the guardrail and whether or not the erroneously-recognized object is detected in a given detection zone defined ahead of the vehicle.

5. An obstacle warning system for a vehicle, comprising:

obstacle detecting means for detecting a distance to an obstacle and an angle of the obstacle within a forward detection zone defined by a given angle in a width direction of the vehicle;

warning means for issuing an alarm when the obstacle detected by said obstacle detecting means satisfies a given warning condition;

guardrail detecting means for detecting a guardrail on the basis of the distance to the obstacle and the angle of the obstacle detected by said obstacle detecting means when the obstacle detected by said obstacle detecting means extends a long distance along a forward direction of the vehicle;

curved state detecting means for detecting a curved state of a road through determination as to whether or not the guardrail detected by said guardrail detecting means is located in a predetermined area in front of said vehicle; and warning condition correcting means for correcting the warning condition on the basis of the curved state of the road detected by said curved state detecting means.

6. An obstacle warning system as set forth in claim 5, further comprising:

curvature radius calculating means for calculating a curvature radius from a path or a locus of the obstacle detected by said obstacle detecting means when the obstacle is substantially stationary, wherein said curved state detecting means detects the curved state on the basis of both the position of the guardrail provided by said guardrail detecting means and the curvature radius provided by said curvature radius calculating means.

7. An obstacle warning system as set forth in claim 5, wherein said curved state detecting means detects the curved state on the basis of both the position of the guardrail detected by said guardrail detecting means and whether or not a plurality of obstacles detected by said obstacle detecting means exceeds a given value.

8. An obstacle warning system as set forth in claim 5, further comprising:

acceleration calculating means for calculating a relative acceleration between the vehicle and the obstacle detected by said obstacle detecting means; and erroneously-recognized object detecting means for detecting and recognizing the obstacle as an erroneously-recognized object when the relative acceleration provided by said acceleration calculating means is out of a given range, wherein said curved state detecting means detects the curved state on the basis of both the position of the guardrail detected by said guardrail detecting means and whether or not the erroneously-recognized object is detected in a given detection zone defined ahead of the vehicle.

* * * * *